(12) United States Patent
Hong et al.

(10) Patent No.: US 9,900,657 B2
(45) Date of Patent: Feb. 20, 2018

(54) NETWORK TV AND METHOD FOR OPERATING NETWORK TV

(71) Applicants: Hotaek Hong, Seoul (KR); Joonhui Lee, Seoul (KR)

(72) Inventors: Hotaek Hong, Seoul (KR); Joonhui Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 302 days.

(21) Appl. No.: 13/708,300

(22) Filed: Dec. 7, 2012

(65) Prior Publication Data

US 2013/0152135 A1 Jun. 13, 2013

Related U.S. Application Data

(60) Provisional application No. 61/568,638, filed on Dec. 8, 2011.

(51) Int. Cl.
| | |
|---|---|
| G06F 3/00 | (2006.01) |
| H04N 5/445 | (2011.01) |
| H04N 21/462 | (2011.01) |
| H04N 21/41 | (2011.01) |
| H04N 21/422 | (2011.01) |
| H04N 21/4782 | (2011.01) |
| H04N 21/482 | (2011.01) |
| H04N 21/485 | (2011.01) |
| H04N 21/431 | (2011.01) |

(52) U.S. Cl.
CPC ..... *H04N 21/4622* (2013.01); *H04N 21/4126* (2013.01); *H04N 21/4221* (2013.01); *H04N 21/4782* (2013.01); *H04N 21/485* (2013.01); *H04N 21/4828* (2013.01); *H04N 21/4312* (2013.01)

(58) Field of Classification Search
CPC ........... H04N 21/4622; H04N 21/4126; H04N 21/485; H04N 21/4782; H04N 21/4828; H04N 21/4312; H04N 21/4221; H04N 5/44543

USPC ........ 725/51, 109, 110, 135, 39, 46; 348/47, 348/E5.105

See application file for complete search history.

(56) References Cited

U.S. PATENT DOCUMENTS

| | | | |
|---|---|---|---|
| 5,886,690 A * | 3/1999 | Pond et al. ................. | 715/720 |
| 2001/0016947 A1* | 8/2001 | Nishikawa ......... | H04N 5/44543 |
| | | | 725/51 |
| 2002/0078453 A1* | 6/2002 | Kuo .................. | H04N 5/44543 |
| | | | 725/46 |

(Continued)

FOREIGN PATENT DOCUMENTS

| | | |
|---|---|---|
| CN | 1988646 A | 6/2007 |
| CN | 102067069 A | 5/2011 |

(Continued)

*Primary Examiner* — Brian T Pendleton
*Assistant Examiner* — Alan Luong
(74) *Attorney, Agent, or Firm* — Dentons US LLP

(57) ABSTRACT

Provided is a method of operating a network TV. The method includes: displaying a TV-only page of an application selected by a user input; transmitting to a mobile terminal a mobile-only page mutually linked with the TV-only page; and controlling an operation of the application according to a user input transmitted from the mobile terminal.

7 Claims, 22 Drawing Sheets

(56) References Cited

U.S. PATENT DOCUMENTS

| | | | | |
|---|---|---|---|---|
| 2003/0140343 | A1* | 7/2003 | Falvo | H04L 12/2803 725/51 |
| 2005/0283800 | A1* | 12/2005 | Ellis | H04N 5/44543 725/40 |
| 2007/0157282 | A1* | 7/2007 | Park et al. | 725/134 |
| 2007/0162502 | A1* | 7/2007 | Thomas | G06F 17/3082 |
| 2008/0126984 | A1* | 5/2008 | Fleishman | G06F 9/4443 715/810 |
| 2009/0037954 | A1* | 2/2009 | Nagano | H04H 60/72 725/39 |
| 2009/0077467 | A1* | 3/2009 | Adappa | G06F 3/0238 715/719 |
| 2011/0030010 | A1* | 2/2011 | Overbaugh | H04N 5/44543 725/45 |
| 2011/0043326 | A1* | 2/2011 | Lee | H04N 7/163 340/5.8 |
| 2012/0254952 | A1* | 10/2012 | Rudolph | G01D 4/002 726/4 |
| 2013/0047178 | A1* | 2/2013 | Moon | H04N 21/4122 725/25 |
| 2013/0061151 | A1* | 3/2013 | Perry | 715/744 |

FOREIGN PATENT DOCUMENTS

| | | |
|---|---|---|
| KR | 10-07-56555 B1 | 3/2007 |
| KR | 10-2010-0101754 | 9/2010 |
| KR | 10-2011-0013482 | 2/2011 |
| KR | 10-2011-0018697 | 2/2011 |
| KR | 10-2011-0054995 | 5/2011 |
| KR | 10-2011-0101717 | 9/2011 |

* cited by examiner

Merge of conventional & smart TV system

FIG.24

| Category | Function | API | Description |
|---|---|---|---|
| Channel | Search, Add, Delete | ScanChannel<br>AddChannel<br>HideChannel<br>DeleteChannel<br>GetChannelList | Used to manage channel list |
| Video | Video mode, Brightness, Contrast, Sharpness, Color | SetVideoMode<br>SetBrightness<br>SetContrast<br>SetSharpness<br>SetColor<br>GetVideoParameter<br>GotoAudioonlymode | Used to control video parameters |
| Audio | Audio mode, Equalizer | SetAudioMode<br>SetEqualizer<br>SetTreble<br>SetBase<br>GetAudioParameter | Used to control audio parameters |
| EPG | Order setup, Add, Delete | SetEPGorder<br>AddEPG<br>HideEPG<br>GetEPGappList | Used to manage app. list supporting Live broadcast and support EPG |
| Search | Order setup, Add, Delete | SetSearchOrder<br>AddSearch<br>HideSearch<br>GetSearchappList | Used to manage app. list supporting VoD or Live broadcast and support content search functionality |
| Mobile App. | WiFi Connection/Disconnection, Bluetooth Connection/Disconnection | FindMobileApp(WiFi/BlueTooth)<br>GetMobileDeviceList | Used to control mobile device connectivity |
| TV App. | Order setup, Add, Delete | AddTVapp<br>DeleteTVapp<br>GetTVappList<br>UpdateTVapp | Used to manage TV app. List |
| General | WiFi Setup, BlueTooth Setup | SetWiFiConnection<br>SetBTConnection<br>GetConnectionInfo(WiFi/BlueTooth)<br>GotoStandbymode | Used to control communication channel settings |

NETWORK TV AND METHOD FOR OPERATING NETWORK TV

CROSS-REFERENCE TO RELATED APPLICATIONS

Pursuant to 35 U.S.C. § 119(a), this application claims the benefit of earlier filing date and right of priority to U.S. patent application Ser. No. 61/568,638, filed on Dec. 8, 2011, the contents of which are hereby incorporated by reference herein in their entirety.

BACKGROUND

The present disclosure relates to a network TV, and more particularly, to a network TV providing a browser-based user interface and a method of operating the same.

An image display device is a device with a function for receiving and processing a broadcast image that a user can watch. The image display device may display a broadcast that a user selects among broadcast signals transmitted from a broadcasting station. The current broadcast trend is the conversion from analog broadcast into digital broadcast. The digital broadcast means a broadcast transmitting digital video and audio signals.

Accordingly, as a digital based TV technology is developed and commercialized, various kinds of content services such as real-time broadcasts, Contents on Demand (COD), games and news may be provided to a user via an internet network connected to each home in addition to an existing propagation medium.

One example of contents services using the internet network is an Internet Protocol Television (IPTV). The IPTV means to transmit various information services, video contents, and broadcasts via a high-speed Internet network and provide them to a user's TV.

Recently, as one step further advanced network TV form such an IPTV, concepts of a broadband TV and a web TV have been suggested. Unlike a conventional IPTV, there are a plurality of contents providers in the broadband TV or the web TV. A user may separately access a plurality of contents providers in order to receive contents such as various VOD, games and video call services that each content provider provides.

Likewise, as a smart TV combining the features of an image display device and a multimedia device is introduced, a user interface providing a unified search of broadcast signals transmitted from a broadcasting station and contents provided from a plurality of contents providers becomes necessary.

SUMMARY

Embodiments provide a unified search method to allow a user to conveniently search broadcast signals and contents.

In one embodiment, a method of operating a network TV includes: displaying a TV-only page of an application selected by a user input; transmitting to a mobile terminal a mobile-only page mutually linked with the TV-only page; and controlling an operation of the application according to a user input transmitted from the mobile terminal.

In another embodiment, a method of operating a network TV includes: displaying a TV-only page of a setup application according to a user input; transmitting to a mobile terminal a mobile-only page that is mutually linked with the TV-only page; and calling a system Application Programming Interface (API) according to a function change command transmitted from the mobile terminal; and applying a changed function to each of the TV-only page and the mobile-only page by using the system API.

In further another embodiment, a network TV includes: a display; a mobile interface; and a browser controlling a TV-only page of an application selected by a user input to be displayed on the display and controlling a mobile-only page that is mutually linked with the TV-only page to be transmitted to a mobile terminal through the mobile interface, and controlling an operation of the application according to a user input transmitted from the mobile terminal.

The details of one or more embodiments are set forth in the accompanying drawings and the description below. Other features will be apparent from the description and drawings, and from the claims.

BRIEF DESCRIPTION OF THE DRAWINGS

FIG. 24 is a table illustrating a network TV setup API according to an embodiment of the present invention.

DETAILED DESCRIPTION OF THE EMBODIMENTS

Hereinafter, embodiments of the present invention will be described with reference to the drawings below.

The suffix "module" and "unit" for components, which are used in the description below, are assigned and mixed in consideration of only the easiness in writing the specification. That is, the suffix itself does not have different meanings or roles Additionally, a network TV described in this specification, as an artificial intelligent network TV having a computer supporting function in addition to a broadcast receiving function, may have a convenient interface such as a handwriting type input device, a touch screen, or a spatial remote controller by adding an internet function while fulfilling the broadcast receiving function. Moreover, the image display device 100 may perform functions such as e-mail, web browsing, banking, or gaming in access to an internet and computer with the support of a wired or wireless internet function. A standardized general OS may be used for such various functions.

Accordingly, for example, since the network TV of the present invention adds or deletes various applications on a general OS kernel without restrictions, it may perform various user-friendly functions. The network TV may be an Internet Protocol Television (IPTV), a Hybrid Broadcast Broadband Television (HBBTV), a Smart Television, and a Connected Television.

Furthermore, with reference to the accompanying drawings and the contents relating thereto, embodiments of the present invention will be described in more detail, but the present invention is not limited to the embodiments.

The terms used in this specification selects currently widely used available general terms but may vary according to the intentions or practices of those skilled in the art or the advent of new technologies. Additionally, in certain cases, the applicant may arbitrarily select terms, and in this case, their meanings will be described in the corresponding description part of the present invention. Accordingly, the terms used in this specification should be interpreted on the basis of the practical implications that the terms have and the contents across the specification.

Figure 1:
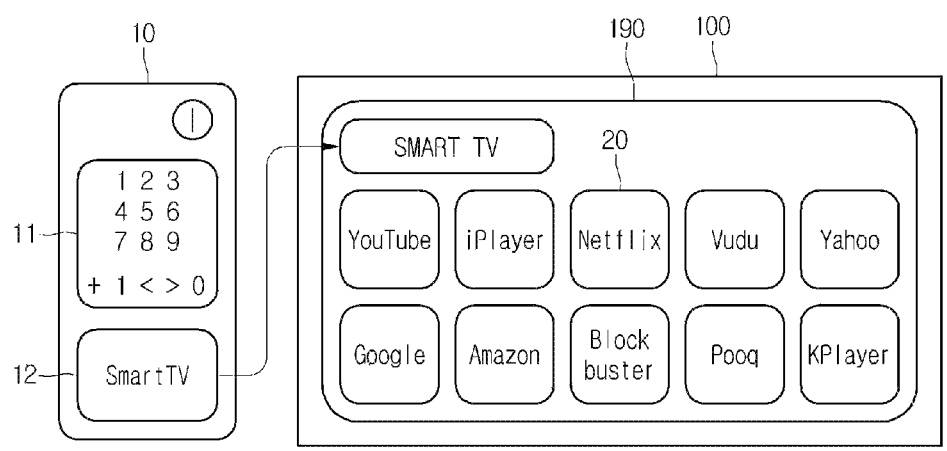
FIG. 1 is a view illustrating a method of switching a TV screen into a smart TV screen according to an embodiment of the present invention.

FIG. 1 is a view illustrating a method of switching a TV screen into a smart TV screen according to an embodiment of the present invention.

Referring to FIG. 1, the network TV 100 switches a TV screen displayed on a display unit 190 into a smart TV screen in response to a control of the remote control device 10. A smart TV may perform a browser function and a TV-only application function. In addition to the basic function for receiving and processing a broadcast signal, the network TV 100 accesses a smart TV menu via internet and uses smart TV service, so that it may perform a smart TV function independently. That is, the smart TV function does not require a change of the basic function and thus does not interfere with a broadcasting function.

On the contrary, since the basic function is separately performed from a smart TV function, a user, who is used to watching a broadcast according to the basic function of the network TV 100, may have difficulties to launch a smart TV menu described below.

For example, as shown in FIG. 1, in order to display a smart TV screen on a display unit 190 of the network TV 100, a user needs to select a smart TV button 12 equipped in the remote control device 10. In addition to a general button unit 11, the smart TV button 12 may be included in the remote control device 10.

Additionally, although not shown in FIG. 1, by selecting a smart TV item in a menu that the network TV 100 provides, a user may display a smart TV screen on the display unit 190 of the network TV 100.

Such a smart TV lunching method may interfere with a user's intuitive TV function use.

Additionally, a smart TV screen displayed on the display unit 190 of the network TV 100 may include an icon 200 meaning a TV-only application. However, the number of icons 20 displayable on a smart TV screen is unlimited, a method of selecting one of them may be cumbersome for a user who is used to a channel selection method or a program guide method through EPG.

Figure 2:
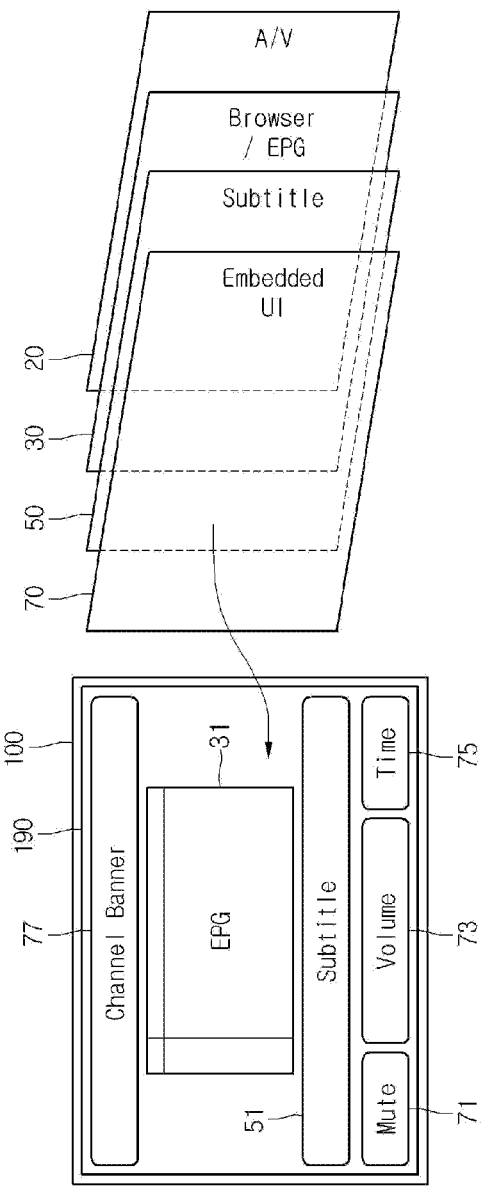
FIG. 2 is a view illustrating an embedded UI layer.

FIG. 2 is a view illustrating an embedded user interface layer.

Referring to FIG. 2, the display unit 190 of the network TV 100 displays a plurality of objects. An object may mean a component constituting a network TV screen. The object may include a Channel Banner 77, an EPG 31, a Subtitle 51, and Mute, Volume, and Time adjustment buttons 71, 73, and 75.

Additionally, a network TV screen may consist of a plurality of layers. The plurality of layers constituting a network TV screen may include an Audio/Video (A/V) layer 20, a browser/EPG layer 30, a Subtitle layer 50, and an embedded user interface (UI) layer 70. At this point, the A/V layer 20 may include an A/V output displayed on the overall surface of the display unit 190. The browser/EPG layer 30 may include the EPG 31. Although not shown in FIG. 2, the browser/EPG layer 30 may include a browser. The subtitle layer 50 may include the subtitle 51. The embedded UI layer 70 may include the channel banner 77, the mute adjustment button 71, the volume adjustment button 73, and the time adjustment button 75, and is not limited thereto.

Figure 3:
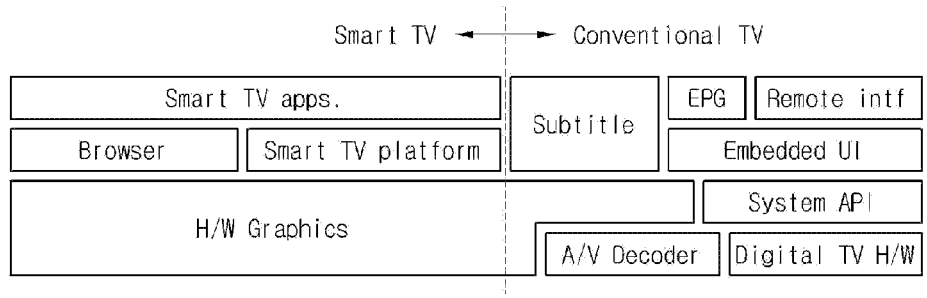
FIG. 3 is a view illustrating a platform structure of a TV having a divided existing TV screen and smart TV screen.

FIG. 3 is a view illustrating a platform structure of a TV having a divided existing TV screen and smart TV screen.

The existing TV screen may mean a TV screen where the above-mentioned basic function is performed and the smart TV screen may mean a TV screen where the above-mentioned smart TV function is performed.

Referring to FIG. 3, the basic function may be realized on a conventional TV system, and the smart TV function may be realized on a smart TV system. That is, the conventional TV system and the smart TV system may exist separately.

The conventional TV system structure may include a hardware and system layer such as a Digital TV Hardware (H/W) layer, an A/V Decoder layer, an H/W Graphics layer, and a System Application Programming Interface (API) layer and an application layer such as an Embedded UI layer, a Subtitle layer, an EPG layer, a Remote intf. layer.

By using such a conventional TV system structure, the network TV 100 may perform a basic function in such a way of displaying an embedded UI, an A/V output, and a remote interface on the basis of hardware graphics.

The smart TV system structure may further include a Middleware layer such as a Browser layer providing smart TV service and a Smart TV platform layer in addition to a hardware and system layer such as an H/W Graphics layer and an application layer such as a Smart TV apps. layer.

By using such a smart TV system structure, the network TV 100 may perform a mart TV function in such a way of registering and managing smart TV applications.

Accordingly, the conventional TV system and the smart TV system may operate separately.

Moreover, an operation of an application layer such as the browser/EPG layer 30, the Subtitle layer 50, and the embedded UI layer 70 depends on the hardware and system layer as shown in FIG. 3. That is, since the embedded UI layer is limited in terms of hardware, a graphic change of an embedded UI is difficult and menus or functions provided are limited regardless of types of running services.

Next, referring to FIGS. 4 and 5, an integrated TV system for providing a more intuitive smart TV launching method will be described according to an embodiment of the present invention. Hereinafter, the same part of the above description will be briefly described or omitted entirely.

Figure 4:
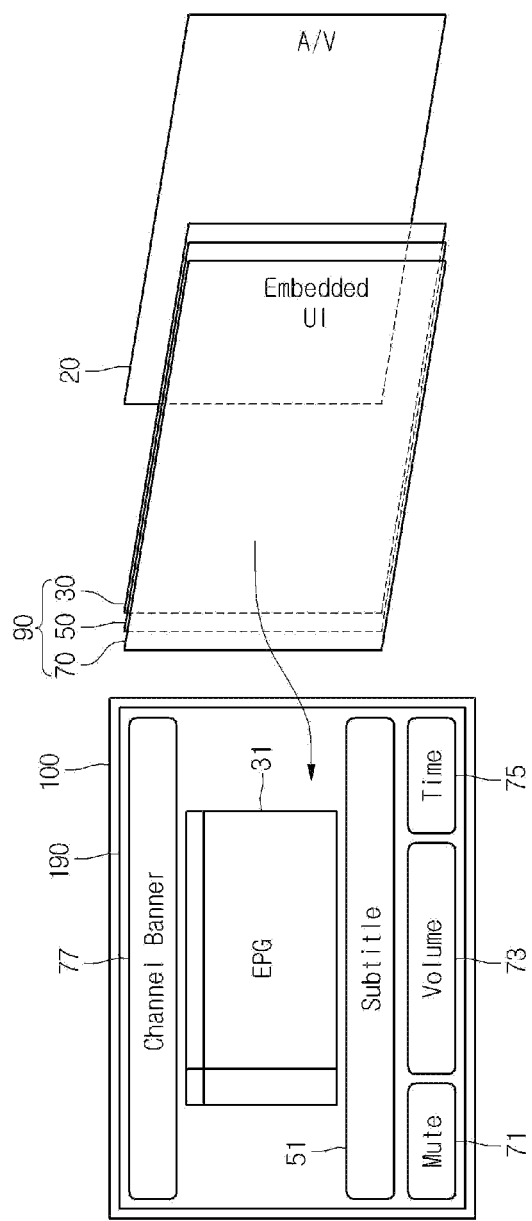
FIG. 4 is a view illustrating an integrated UI layer according to an embodiment of the present invention.

FIG. 4 is a view illustrating an integrated UI layer according to an embodiment of the present invention.

Referring to FIG. 4, a display unit 190 of the network TV 100 displays a plurality of objects such as a channel banner 77, a mute adjustment button 71, a volume adjustment button 73, and a time adjustment button 75.

Additionally, a network TV screen may include an A/V layer 20, a browser/EPG layer 30, a Subtitle layer 50, and an embedded UI layer 70. At this point, the browser/EPG layer 30, the Subtitle layer 50, and the embedded UI layer 70 may be managed as one by the browser of the network TV. The layer indicated with the reference number 90 means a layer that may be managed as one by the browser of the network TV.

Figure 5:
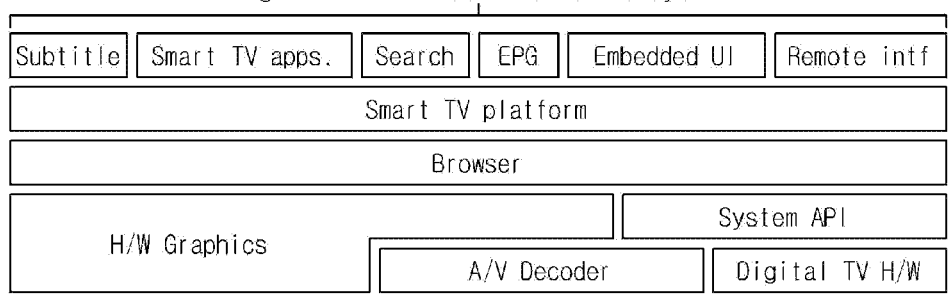
FIG. 5 is a view illustrating a platform structure of a TV having an integrated existing TV screen and smart TV screen.

FIG. 5 is a view illustrating a platform structure of a TV having an integrated existing TV screen and smart TV screen.

Referring to FIG. 5, a basic function and a smart TV function may be realized on the same TV system. That is, the one integrated TV system may exist.

The integrated TV system structure may include a hardware and system layer such as a Digital TV H/W layer, an A/V Decoder layer, a H/W Graphics layer, and a System API layer, a middleware layer such as a Browser layer and a Smart TV platform layer, and an application layer such as a Subtitle layer, a Smart TV apps. layer, a search layer, an EPG layer, an Embedded UI layer, and a Remote intf. layer.

By using such an integrated TV system structure, the network TV 100 may perform all application operations including TV watching, menu setting, and EPG outputting on an integrated platform of the Browser layer and the Smart TV platform layer.

That is, since system API and graphics output are possible using a browser on an integrated platform in the network TV 100, all UIs may be outputted based on Hyper Text Markup Language (HTML). Since the network TV 100 uses an HTML based browser, the design of a basically mounted UI such as a setting menu, an EGP, and a search window may be easily changed. Additionally, since it is possible to add a browser API, it is not necessary to directly call a system API. Therefore, a unified interface may be provided.

Additionally, since the network TV 100 performs a basic function and a smart TV function on the integrated platform, an EPG function for real-time broadcast search and a VOD search function may be integrated and serviced.

Accordingly, the conventional TV system and the smart TV system may operate simultaneously. The network TV 100 on the integrated TV system may manage a plurality of layers 90 as one according to a broadcast watching mode, a smart mode, and a UI mode.

For example, in the broadcast watching mode, the network TV 100 may transparently displays the browser/EPG layer 30, and may easily launch a corresponding layer when a service interworking with a smart TV function is provided. At this point, the subtitle layer 50 may be activated.

Additionally, in a smart mode, the network TV 100 may activate the browser/EPG layer 30 of a TV application and may deactivate the subtitle layer 50.

In each of the broadcast watching mode and the smart mode, the network TV 100 may launch the UI mode, and may change a UI configuration by displaying a background screen transparently, semi-transparently, or opaquely.

Therefore, more intuitive smart TV launching is possible according to an embodiment of the present invention.

Figure 6:
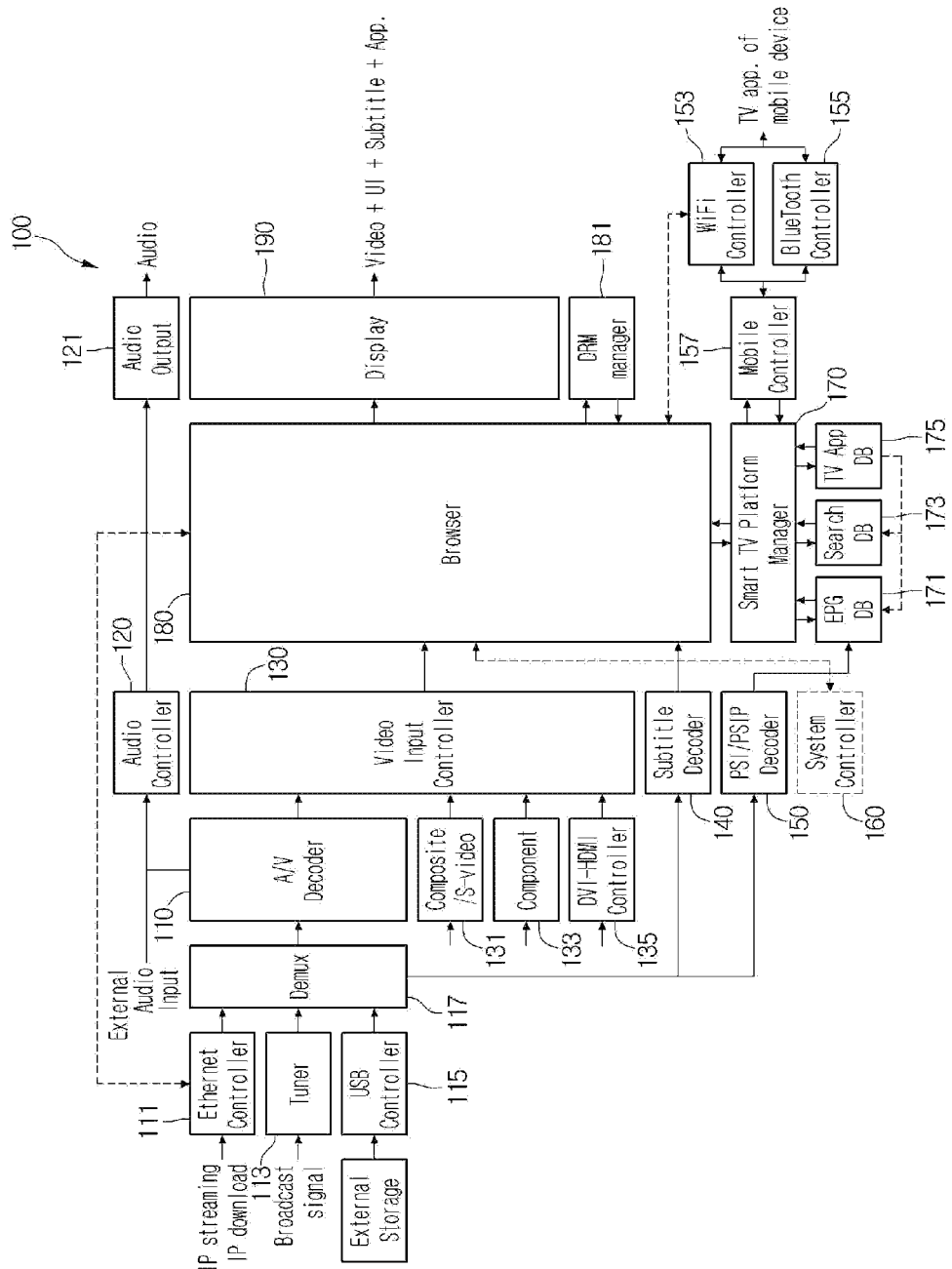
FIG. 6 is a view illustrating a configuration of a network TV system according to an embodiment of the present invention.

FIG. 6 is a view illustrating a configuration of a network TV system according to an embodiment of the present invention.

Referring to FIG. 6, the network TV 100 includes an Ethernet Controller 111, a Tuner 113, a Universal Serial Bus (USB) Controller 115, a Demux 117, an Audio/Video Decoder 110, a Composite/S-video 131, a Component 133, a Digital Video/visual Interactive/High Definition Multimedia Interface (DVI/HDMI) Controller 135, a Video Input Controller 130, an Audio Controller 120, a Video Input Controller 130, a Subtitle Decoder 140, a Program Specific Information/Program and System Information Protocol (PSI/PSIP) Decoder 150, a System Controller 160, the browser 180, a Smart TV Platform Manager 170, an EPG DB 171, a Search DB, 173, a TV App. DB 175, an Audio Output 121, the display 190, a Digital Rights Management (DRM) Manager 181, a Mobile Controller 157, a WiFi Controller 153, and a Bluetooth Controller 155.

The Ethernet controller 111 may receive data packets through an Internet Protocol (IP) streaming method or an IP download method in access to a network. If data packets are video and audio multimedia data, they may be played on the network TV 100.

The tuner 113 may receive broadcast signals. The tuner 113 may be a digital broadcasting receiving tuner, and may include a Vestigial Side Bands (VSB) type tuner and an Orthogonal Frequency Division Multiplexing type tuner.

The USB controller 115 may receive an external input signal transmitted from an external storage.

Then, data packets received through the Ethernet controller 111, broadcast signals received through the tuner 113, and external input signals received through the USB controller 115 are separated into various additional data defined as a video signal, an audio signal, a subtitle signal, and a PSI/PSIP signal through the demux 117, and then are outputted in a bit stream format. At this point, the outputted bit stream may be Moving Picture Experts Group-2 (MPEG-2) Transport Stream.

A video signal separated through the demux 117 may be transmitted to the video input controller 130 through the A/V decoder 110. The A/V decoder 110 may play a video signal such as an MPEG-2 stream format and an Advanced Video Coding (AVC) format.

An audio signal separated through the demux 117 may be transmitted to the audio controller 120 through the A/V decoder 110. The A/V decoder 110 may play an audio signal such as an Audio Codec code 3 (AC3) format, an MPEG-2 format, an Advanced Audio Coding (AAC) format, and an MPEG-1 Audio Layer-3 (MP3) format.

A subtitle signal separated through the demux 117 may be transmitted to the subtitle decoder 140, and a PSI/PSIP signal may be transmitted to the PSI/PSIP decoder 150.

The video input controller 130 controls a video signal decoded in the A/V decoder 110 and also an external video input signal received from each of the Composite/S-video 131, the Component 133, and the DVI/HDMI Controller 135 to be transmitted to the browser 180.

The audio controller 120 controls an audio signal decoded in the A/V decoder 110 and also an external audio input to be transmitted to the browser 180.

The system controller 160 may transmit/receive a setting signal of the network TV 100 according to a user's input to/from the browser 180

The browser 180 has a configuration to provide a smart TV function of the network TV 100. All contents displayed on the screen of the network TV 100 such as data packets, broadcast signals, and external input signals transmitted through the video input controller 130 and the subtitle decoder 140 may be arranged and managed as objects of the browser 180.

Additionally, the browser 180 controls an operation and a screen display of a TV application, which is downloaded through the Ethernet controller 111 and the WiFi controller 153 or transmitted from the smart TV platform manager 170. The browser 180 may receive a certified TV application package from the DRM manager 181 in order to control an operation of a TV application. The browser 180 may display a received video signal in order to display the screen of a TV application.

The browser 180 may use HTML, Cascading Style Sheets (CSS), and JAVAscript in order to control an operation and a screen display of a TV application.

The display 190 may output a video signal, a UI, a subtitle, and an application screen.

The audio output 121 may output an audio signal received from the audio controller 120.

The smart TV platform manager 170 may receive TV application package, real-time application EPG information, and VOD application search result information through the browser 180. The smart TV platform manager 170 may perform application authentication through the DRM manager 181 connected to the browser 180.

The smart TV platform manager 170 may store EPG link information, search link information, and TV application package in the EPG DB 171, the search DB, and the TV app. DB 175, respectively, and then may generate a necessary HTML screen according to an operation mode of the network TV 100.

The EPG DB 171 and the search DB 173 may respectively receive EPG link information and search link information extracted from a TV application package stored in the TV app. DB 175.

The smart TV platform manager 170 may exchange a signal, which relates to the remote control device 10 linked with the network TV 100, with the mobile controller 157. The mobile controller 157 may receive a control signal of the network TV 100 from the remote control device 10 or may transmit an operation signal of the network TV 100 to the remote control device 10, but is not limited thereto. The mobile controller 157 may use the WiFi controller 153 and the Bluetooth controller 155 in order to communicate with the remote control device 10.

The WiFi controller 153 and the Bluetooth controller 155 may operate in a standby mode in order to execute a Wakeup On LAN (WOL) function.

Next, a TV application configuration will be described according to an embodiment of the present invention.

Figure 7:
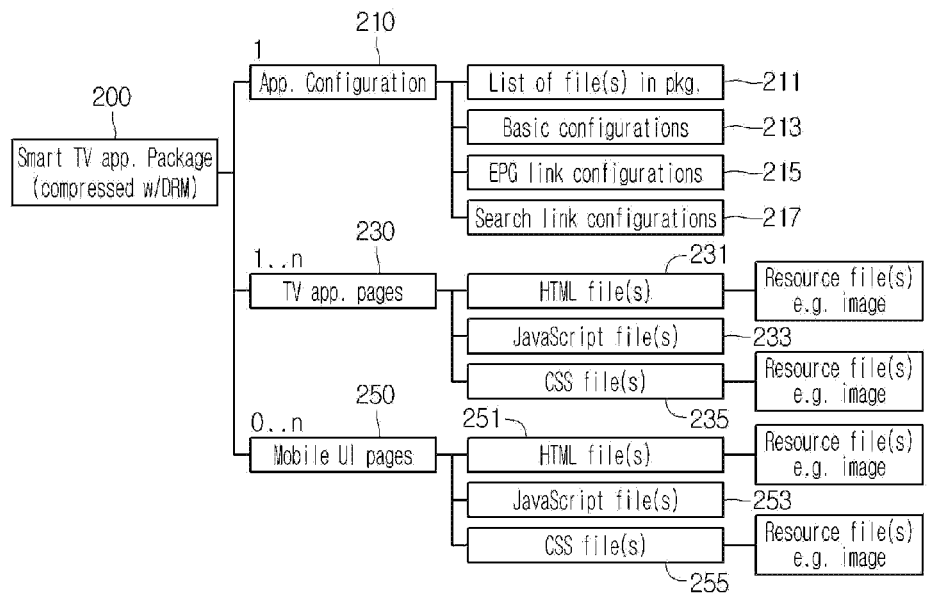
FIG. 7 is a view illustrating a TV application configuration according to an embodiment of the present invention.

FIG. 7 is a view illustrating a TV application configuration according to an embodiment of the present invention.

The TV application that the network TV 100 receives from a network consists of a package including a plurality of files shown in FIG. 7. The network TV 100 downloads and installs a smart TV app. Package 200 compressed w/DRM.

The TV app. Package 200 may include an App. Configuration 210, TV app. Pages 230, and Mobile UI pages 250.

The App. Configuration 210 may include a List of file(s) in pkg 211 included in the TV app. Package 200, Basic configurations 213 used when a corresponding TV application is installed in the network TV 100, and a configuration used for integrated management of the network TV 100.

The configuration used for integrated management of the network TV 100 may include EPG link configurations 215 when a corresponding TV application is a real-time broadcast application and Search link configurations 217 when a corresponding TV application is a VOD application.

The App. Configuration 210 is a required configuration, and it is determined according to information set in the basic configurations 213 whether there are the EPG link configurations or the search link configurations 217.

The TV app. pages 230 are a file including pages that are transmitted to the browser 180 when a TV application is executed. The TV app. pages 230 may include HTML file(s) 231, JavaScript file(s) 233, and CSS file(s) 235. The browser 180 may receive the TV app. pages 230 and then may display them on the display 190. The HTML file(s) 231 may include a component for constituting a page displayed on the display 190. The JavaScript file(s) may include a system driving API used in an HTML page and a component for setting an input/output operation of an HTML page itself. The CSS file(s) 235 may include a component for setting an icon or color of an HTML page. The HTML file(s) 231 may include a plurality of pages necessary for screen switching.

The Mobile UI pages 250 are a file for setting the network TV 100 or a screen displayed during execution of an application, which controls a TV application executed in the network TV 100, through a mobile device, i.e. a kind of the remote control device 10. According to information set in the basic configurations 213, it is determined whether there are the Mobile UI pages 250. The Mobile UI pages 250 may include a plurality of pages necessary for screen switching.

Likewise, through the TV app. Package 200, a method of registering and changing a TV application in the network TV 100 and displaying an execution screen of a TV application on the display 190 will be described with reference to FIG. 12, FIGS. 14 to 19, and FIG. 21.

Next, with reference to FIGS. 8 to 10, a TV application control method of a network TV using a remote control device will be described.

Figure 8:
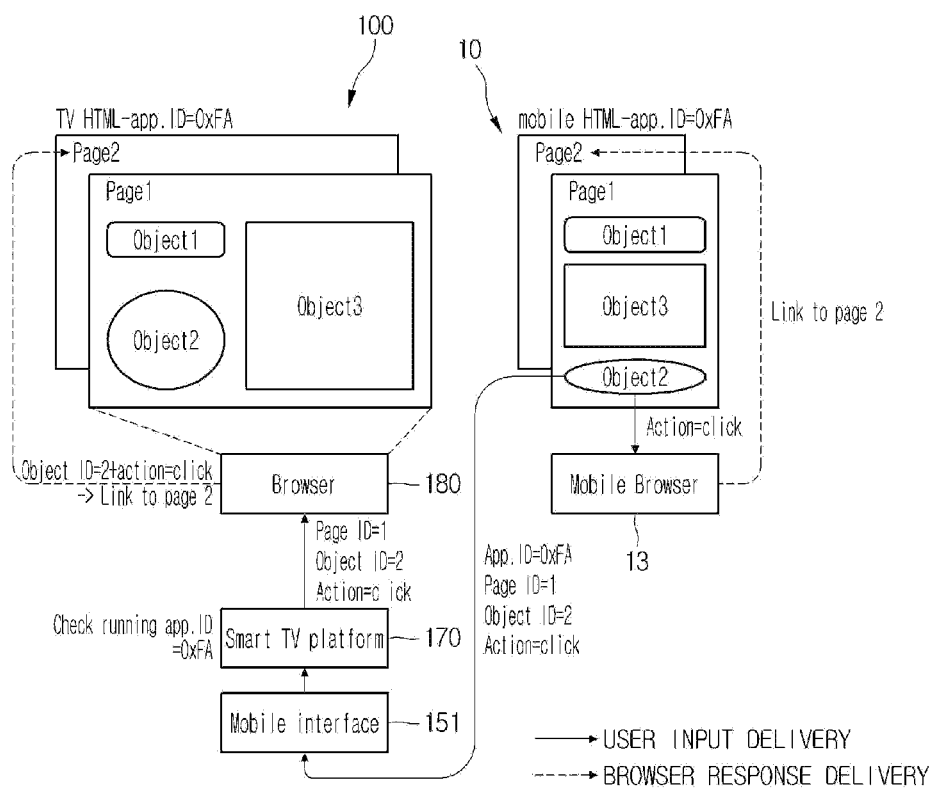
FIG. 8 is a view illustrating a method of linking a network TV screen with a screen of a remote control device controlling a network TV according to an embodiment of the present invention.

FIG. 8 is a view illustrating a method of linking a network TV screen with a screen of a remote control device controlling a network TV according to an embodiment of the present invention.

Referring to FIG. 8, the remote control device 10 may receive a user input by executing a TV control application. An execution screen of a TV control application executed in the remote control device 10 may have the same configuration as that of a TV application executed in the network TV 100. A user input may include a command for selecting at least one object displayed on an execution screen of a TV control application.

For example, the remote control device 10 may display on an execution screen of a TV control application a first page Page1 including a first object Object1, a second object Object2, and a third object Object3. At this point, the remote control device 10 may receive a user input for selecting the second object Object2. A user input for selecting the second object Object2 may include a user input for clicking the area of the second object Object2 on a screen.

A user input for selecting the second object Object2 is transmitted to the mobile browser 13 of the remote control device 10, and the mobile browser 13 may display a second page Page2 on an execution screen of a TV control application according to a user input.

Additionally, the remote control device 10 transmits control information according to the received user input to the mobile interface 151 of the network TV 100. The mobile interface 151 receives a control signal of the network TV 100 generated from the remote control device 10 and then transmits the received control signal to the mobile controller 157. The control signal of the network TV 100 according to a user input received in the mobile interface 151 may include an application ID for identifying a corresponding TV application, a page ID for identifying a corresponding page, an object ID, and an action code. For example, a control signal of the network TV 100 may include the application ID having the value of "0xFA", the page ID having the value of "1", the object ID having the value of "2", and the action code corresponding to "click".

The mobile interface 151 may transmit a control signal of the network TV 100 to the smart TV platform manager 170. Then, the smart TV platform manager 170 may check whether the TV application having the value of "0xFA" is executed on the network TV 100.

When the TV application having the value of "0xFA" is executed on the network TV 100, the smart TV platform manager 170 may transmit to the browser 180 information except the TV application ID among the received control signal of the network TV 100. Then, the browser 180 may execute "Link to page 2", which is the result obtained when an action "click" is executed on the object having the value of "2" in the page having the value of "1". That is, the browser 180 may display the second page Page2 on the display 190.

According to an embodiment of the present invention shown in FIG. 8, in order for remote control, since the remote control device 10 only needs to transmit corresponding codes to the network TV 100, its implementation is easy. However, if TV HTML and remote control device HTML are not accurately linked, its linkage may be lost. Accordingly, after control signal execution, for example, after a command for screen switching to the second page Page2 is executed, the remote control device 10 may transmit a verification command to the network TV 100. Although not shown in the drawing, after transmitting a control signal of the network TV 100 to the network TV 100, the remote control device 10 may transmit a verification command including a corresponding TV application ID, a corresponding page ID, and an action code corresponding to "checkup".

However, a method of guaranteeing an accurate linkage between TV HTML and remote control device HTML without the transmission of such a verification command will be described with reference to FIG. 9. Hereinafter, the same part of the above description will be briefly described or omitted entirely.

Figure 9:
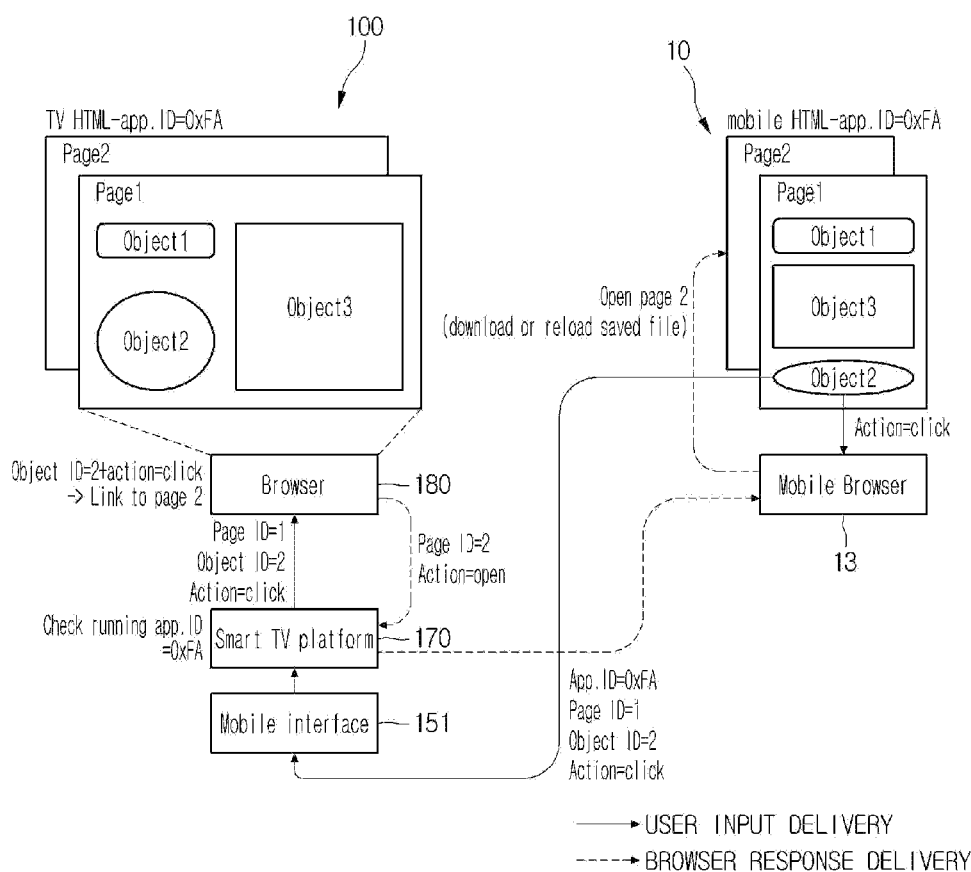
FIG. 9 is a view illustrating a method of linking a network TV screen with a screen of a remote control device controlling a network TV according to another embodiment of the present invention.

FIG. 9 is a view illustrating a method of linking a network TV screen with a screen of a remote control device controlling a network TV according to another embodiment of the present invention.

Referring to FIG. 9, the remote control device 10 may receive a user input by executing a TV control application.

For example, the remote control device 10 may receive a user input for clicking the area of the second object Object2 on a screen.

Then, the remote control device 10 transmits control information according to the received user input to the mobile interface 151 of the network TV 100. A control signal of the network TV 100 may include the application ID having the value of "0xFA", the page ID having the value of "1", the object ID having the value of "2", and the action code corresponding to "click".

The smart TV platform manager 170 receiving the control signal of the network TV 100 through the mobile interface 151 may check whether the TV application having the value of "0xFA" is being executed on the network TV 100.

Then, when the TV application having the value of "0xFA" is being executed on the network TV 100, the browser 180 may execute "Link to page 2", which is the result obtained when an action "click" is executed on the object having the value of "2" in the page having the value of "1". That is, the browser 180 may display the second page Page2 on the display 190.

Then, the browser may transmit to the smart TV platform manager 170 browser operation information including the page ID having the value of "2" and the action code corresponding to "open". The smart TV platform manager 170 may transmit the received browser operation information to the mobile browser 13 of the remote control device 10.

Finally, the mobile browser 13 may display the second page Page2 on an execution screen of a TV control application according to the received browser operation information (Open page 2). At this point, the mobile browser 13 may download the second page Page2 or may reload the saved file in order to display the second page Page2.

Likewise, since a mobile browser executes operation information of a TV browser transmitted to a remote control device, an accurate linkage between TV HTML and remote control device HTML may be guaranteed.

Next, a method of controlling network TV power of a remote control device, which is prerequisite for the linkage between the TV HTML and the remote control device HTML shown in FIGS. 8 and 9, will be described.

Figure 10:
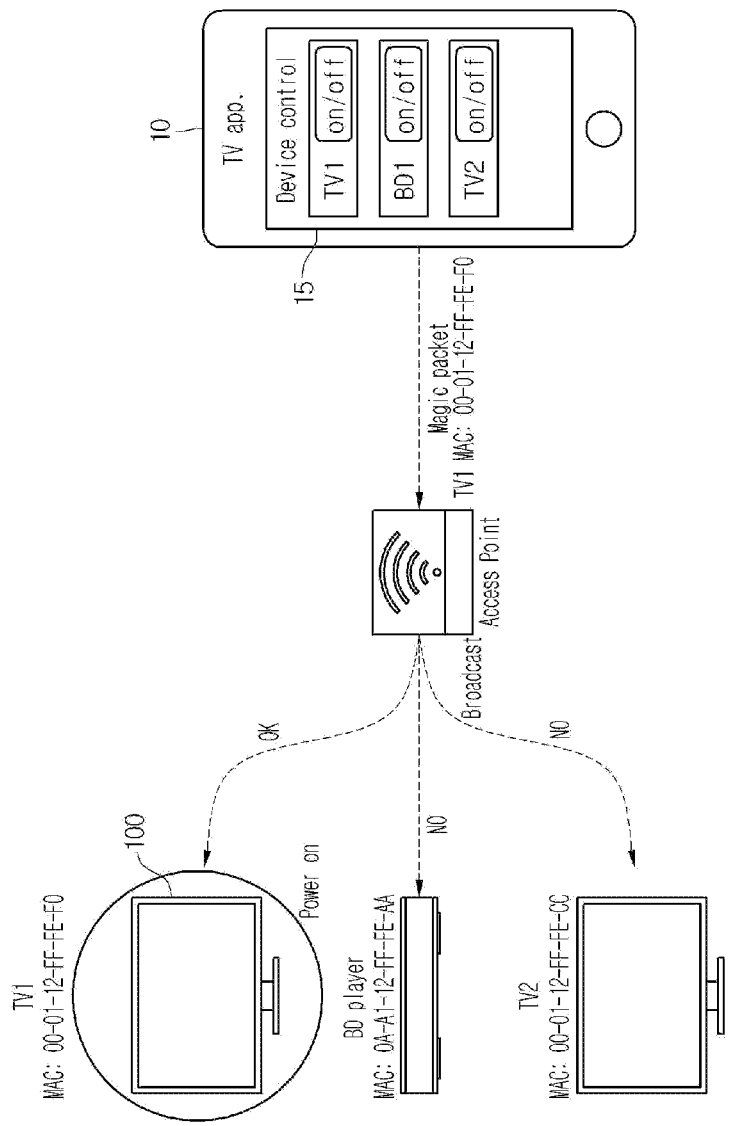
FIG. 10 is a view illustrating a network TV controlling method of a remote control device according to an embodiment of the present invention.

FIG. 10 is a view illustrating a network TV controlling method of a remote control device according to an embodiment of the present invention.

First, the conditions that the remote control device 10 remotely controls the network TV 10 will be described. The remote control device 10 uses a WOL function typically used in a Personal Computer (PC) in order to control the power of the network TV 100. That is, the remote control device 10 and the network TV 100 should be connected to the same network and power should be being supplied to the network control unit of the network TV 100. Additionally, the remote control device 10 should execute a TV control application to access a control target device, and then should receive and store the Media Access Control address (MAC) of a corresponding control target device. If those conditions are satisfied, the remote control device 10 may control the power of the network TV 100.

As shown in FIG. 10, once a TV control application is executed, the remote control device 10 may display the execution screen of the TV control application on the display 15. The execution screen of the TV control application may include a pre-registered controllable target device list. The pre-registered controllable target device list may include each ID of network TVs TV1 and TV2 or a Blu-ray Disc player.

The remote control device 10 may receive a user input for selecting at least one in the pre-registered controllable target device list. For example, the remote control device 10 may receive a user input for selecting the network TV1 100. Then, the remote control device 10 transmits a Magic packet to a corresponding control target device according to the received user input. For example, the remote control device 10 may transmit to an Access Point the magic packet including "00-01-12-FF-Fe-F0", i.e. the MAC address of the network TV1 100.

The magic packet includes the MAC address of a corresponding control target device, and may be transmitted to a corresponding control target device through an Access Point. The magic packet is a broadcast frame containing anywhere within its payload 6 bytes of all 255 (FF FF FF FF FF FF in hexadecimal), followed by sixteen repetitions of the target computer's 48-bit MAC address, for a total of 102 bytes.

When the MAC address included in the magic packet transmitted from an AP is identical to that of the Ethernet controller 111 itself, the Ethernet controller 111 of the WiFi controller 153 of the network TV 100 may recognize it as a power operation start signal. Accordingly, when the network TV 100 recognizes the magic packet including the same MAC address as itself, it turns on the power to start to link with the TV control application of the remote control device 10, so that TV control service may be provided.

Moreover, the remote control device 10 may input a power operation end signal to the network TV 100 through the system API, so that it may switch the network TV 100 into a standby mode.

Next, with reference to FIGS. 11 to 13, a registration method according to the application buy of a network TV will be described according to an embodiment of the present invention.

Figure 11:
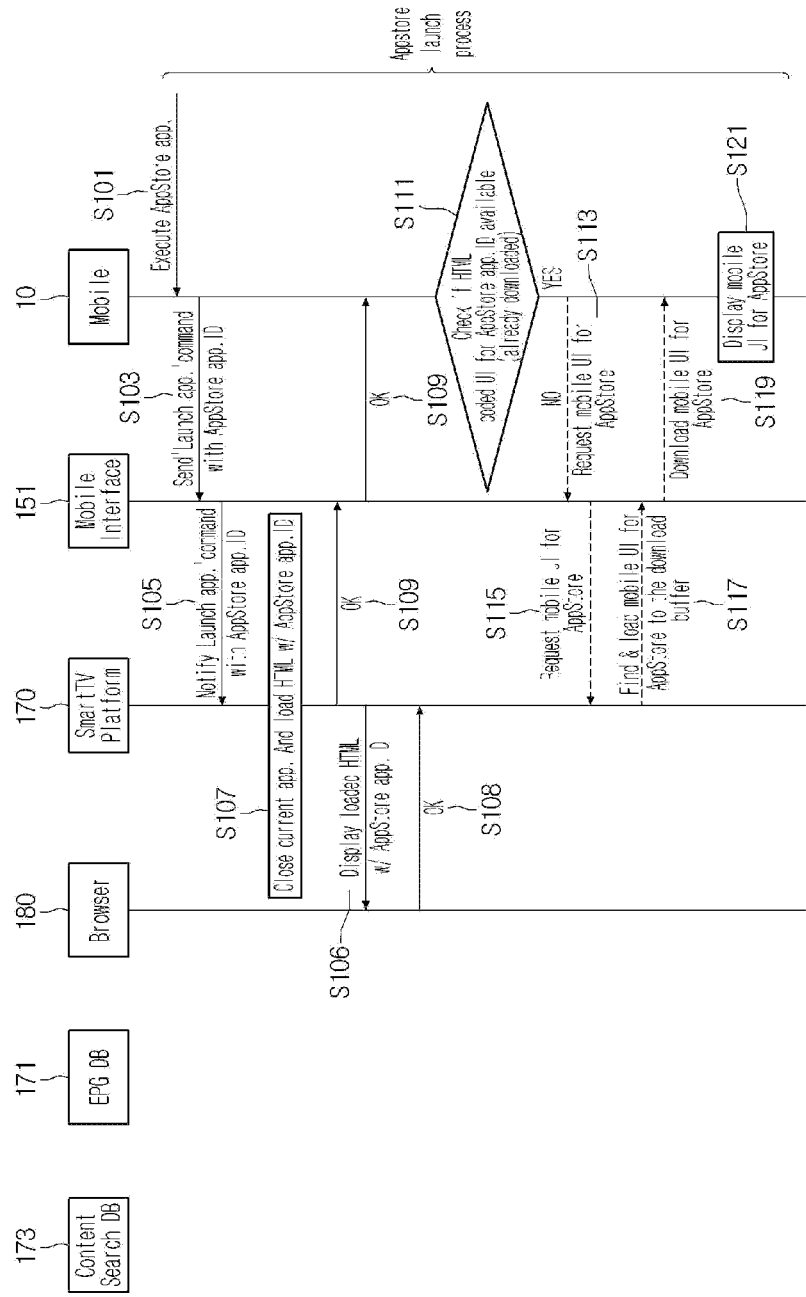
FIG. 11 is a ladder diagram illustrating an app store application entry method of a network TV according to an embodiment of the present invention.

FIG. 11 is a ladder diagram illustrating an app store application launching method of a network TV according to an embodiment of the present invention.

Referring to FIG. 11, the remote control device 10 may receive a user input including Execute AppStore app. in operation S101. An app store, as a kind of an application, may mean an application providing various kinds of TV-only applications.

Then, the remote control device 10 transmits to the mobile interface 151 of the network TV 10 a Launch app. command including an AppStore app. ID in operation S103.

Then, when the mobile interface 151 notifies the smart TV platform manager 170 that the Launch app. command including the AppStore app. ID is transmitted in operation S105, the smart TV platform manager 170 terminates the currently-executing application, and loads the HTML w/ AppStore app. ID in operation S107.

Additionally, when the smart TV platform manager 170 displays the HTML file corresponding to the AppStore app. ID to the browser 180 in operation S106, the browser 180 transmits to the smart TV platform manager 170 the information (OK) that notifies that the HTML file corresponding to the AppStore app. ID is recognized in operation S108.

Then, the smart TV platform manager 170 transmits the HTML file load status (OK) of a corresponding app store application to the remote control device 10 through the mobile interface 151 in operation S109. Then, the remote control device 10 checks whether the HTML-coded UI of a corresponding app store application is useful in operation S111.

When the HTML-coded UI of the corresponding app store application is not useful, the remote control device 10 requests a mobile UI for the corresponding app store application to the mobile interface 151 in operation S113.

When the mobile interface 151 requests the mobile UI for the corresponding app store application to the smart TV platform manager 170 in operation S115, the smart TV platform manager 170 searches for the mobile UI for the corresponding app store application and loads it to the download buffer in operation S117.

When the mobile interface 151 downloads the mobile UI for the corresponding app store application loaded into the download buffer into remote control device 10 in operation S119, the remote control device 10 displays the mobile UI for the corresponding app store application in operation S121. Or, when the HTML-coded UI of the corresponding app store application is useful, the remote control device 10 does not perform operation S113 to operation S119, and displays the mobile UI for the corresponding app store application.

Likewise, since operation S101 to operation S121 are performed, the remote control device 10 may launch an app store control mode in linkage with the network TV 100.

Figure 12:
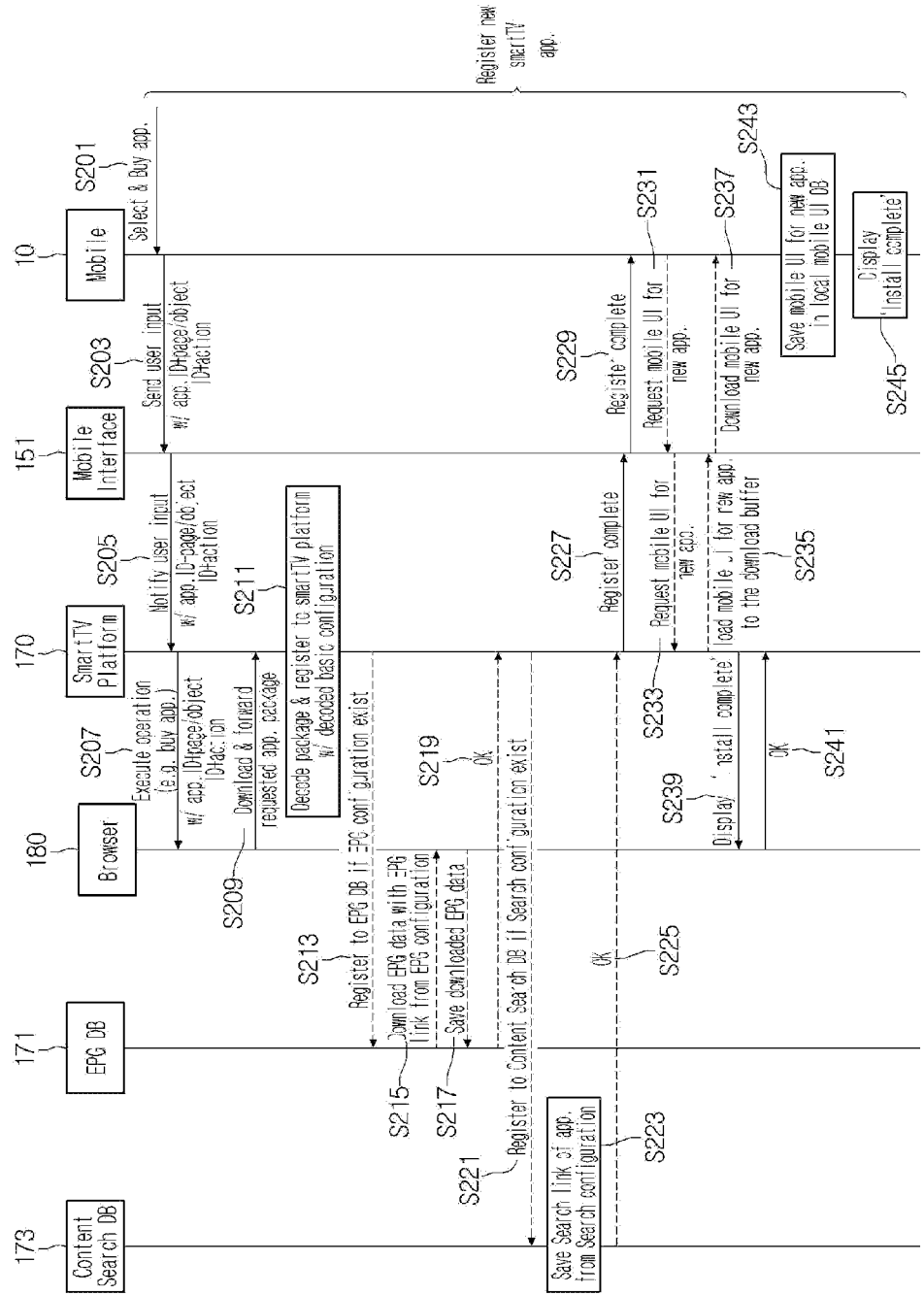
FIG. 12 is a ladder diagram illustrating a new application registering method of a network TV according to an embodiment of the present invention.

FIG. 12 is a ladder diagram illustrating a new application registering method of a network TV according to an embodiment of the present invention.

Referring to FIG. 12, in an app store mode, when receiving a user input for selecting and buying a specific application Select & Buy app. in operation S201, the remote control device 10 transmits the user input to the mobile interface 151 in operation S203. The user input information may include a selected app. ID, a page ID, an object ID, and an action code.

Then, when the mobile interface 151 notifies the user input information to the smart TV platform manager 170 in operation S205, the smart TV platform manager 170 transmits an operation execution command corresponding to the user input information to the browser 180 in operation S207. For example, the operation execution command may include an application buy command selected by a user input.

The browser 180 downloads an application package requested via internet and then forwards it to the smart TV platform manager 170 in response to the operation execution command in operation S209.

Then, the smart TV platform manager 170 decodes the forwarded application package 200, and then registers a corresponding application package according to the information set in the decoded basic configurations 213 in operation S211.

For example, if the EPG link configurations are included in the decoded basic configurations 213, the smart TV platform manager 170 registers the EPG link information of the EPG link configurations in the EPG DB 171 in operation S213. Then, the browser 180 may download the EPG link information from the EPG DB 171 in operation S215 or stores the downloaded EPG link information in the EPG DB 171 in operation S217. At this point, the EPG DB 171 may notify to the smart TV platform manager 170 that the EPG link information is registered (OK) in operation S219.

For example, if the EPG link configurations are included in the decoded basic configurations 213, the smart TV platform manager 173 registers the EPG link information of the EPG link configurations in the EPG DB 171 in operation S221. Then, the content search DB 173 extracts search link information of a corresponding application from the search link configurations 217 and stores it in operation S223. The content search DB 173 may notify to the smart TV platform manager 170 that the EPG link information is registered (OK) in operation S225.

Then, the smart TV platform manager 170 notifies to the remote control device 10 through the mobile interface 151 that the registration is completed in operation S227 and operation S229.

When the remote control device 10 requests a mobile UI for newly-registered application to the smart TV platform manager 170 through the mobile interface 151 in operation S231 and operation S233, the smart TV platform manager 170 searches for the mobile UI for newly-registered application and loads it to the download buffer in operation S235.

When the mobile interface 151 downloads the mobile UI for newly-registered application loaded into the download buffer into remote control device 10 in operation S237, the remote control device 10 stores the mobile UI for newly-registered application in a UI DB in operation S121.

Then, the remote control device 10 displays the mobile UI for newly-registered application in operation S245.

Additionally, the smart TV platform manager 170 notifies "Install complete" to the browser 180 in operation S239, and receives a response for that in operation S241.

Likewise, since operation S201 to operation S245 are performed, the remote control device 10 may register a new application in linkage with the network TV 100.

Next, referring to FIG. 13, a configuration of a new application package used in operation S213 to operation S225 will be described in more detail.

Figure 13:
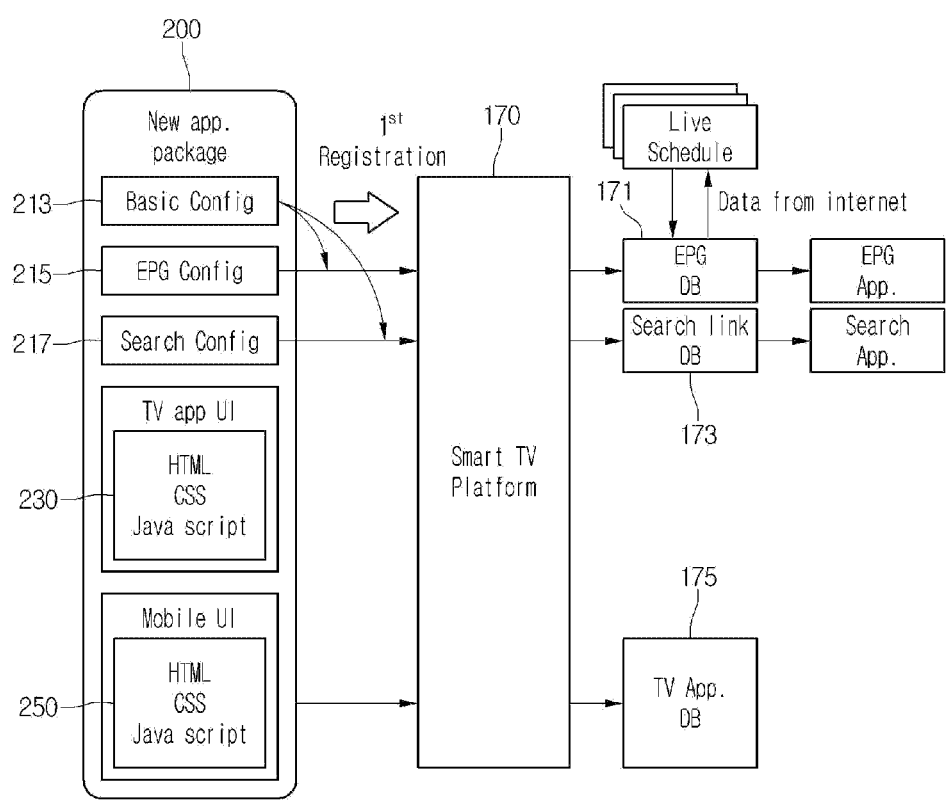
FIG. 13 is a view illustrating a new application registration process of a network TV according to an embodiment of the present invention.

FIG. 13 is a view illustrating a new application registration process of a network TV according to an embodiment of the present invention.

Referring to FIG. 13, a smart TV platform manager 170 controls a registration process of a new application selected and bought from a web store application. The new application may be provided in a New app. package format 200.

The smart TV platform manager 170 may register a new TV application according to the information of basic configurations 213. Additionally, the smart TV platform manager 170 may store the registered TV application in a TV App. DB 175. The smart TV platform manager 170 may recognize whether the New TV app. package supports an EPG function or a search function according to the information of the basic configurations 213 of the registered TV application.

At this point, an application providing a real-time broadcast may include EPG link configurations 215 supporting an EPG function. The EPG link configurations 215 may include a server access path providing EPG data on a real-time broadcast of a corresponding application. Accordingly, the EPG DB 171 may receive and store real-time EPG schedule information via a corresponding server access path.

Moreover, an application providing VOD contents may include search link configurations 217 supporting a contents search function. The search link configurations 217 may include a server access path providing a search result on a contents list that a corresponding application provides. Accordingly, the search link DB 173 may receive and store a search result on a contents list that a corresponding application provides via a corresponding server access path.

Figure 14:
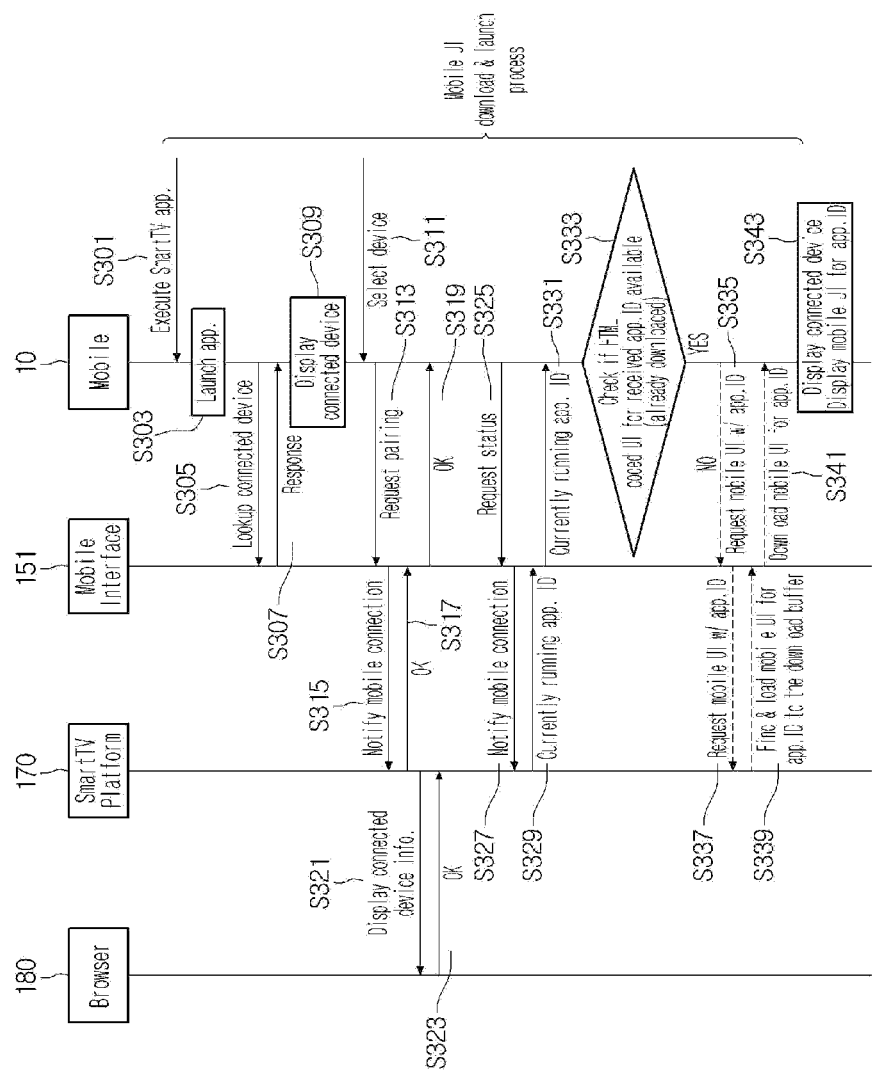
FIG. 14 is a ladder diagram illustrating an application entry method of a network TV according to an embodiment of the present invention.

FIG. 14 is a ladder diagram illustrating an application launching method of a network TV according to an embodiment of the present invention.

Referring to FIG. 14, the remote control device 10 may receive a user input including Execute SmartTV app. in operation S301.

The remote control device 10 launches a TV control application corresponding to the user input in operation S303, and then, transmits "Lookup connected device" to the mobile interface 151 of the network TV 100 in the same network in operation S305.

The mobile interface 151 of the network TV 100 connected to the remote control device 10 transmits a list including the ID of the corresponding network TV 100 to the remote control device 10 in response to the connected device search command in operation S307.

Then, the remote control device 10 displays the identification information of the connected network TV 100 in operation S309.

The remote control device 10 receives a user input for selecting the network TV 100 in operation S311, and requests pairing to the mobile interface 151 of the corresponding network TV 100 in operation S313.

Then, when the mobile interface 151 transmits a connection status notify signal of the remote control device 100 to the smart TV platform manager 170 (Notify mobile connection) in operation S315, the smart TV platform manager 170 notifies to the remote control device 10 through the mobile interface 151 that a corresponding signal is recognized (OK) in operation S317 and S319.

Additionally, when the smart TV platform manager 170 provides the connected device information to the browser 180 in operation 180 in operation S321, the browser 180 notifies to the smart TV platform manager 170 that the connected device information is recognized (OK) in operation S323.

When the remote control device 10 requests a status of a corresponding network TV in operation S325, the mobile terminal interface 151 transmits a connection status notify signal of the remote control device 100 to the smart TV platform manager 170 (Notify mobile connection) in operation S327, and the network TV 100 receives a Currently running app. ID in operation S329.

When the mobile terminal interface 151 transmits the currently running app. ID transmitted from the smart TV platform manager 170 to the remote control device 10 in operation S331, the remote control device 10 may check whether the HTML-coded UI of the received application is useful in operation S333.

When the HTML-coded UI of the corresponding application is not useful, the remote control device 10 requests a mobile UI for the corresponding application to the mobile interface 151 in operation S335.

When the mobile interface 151 requests the mobile UI for the corresponding application to the smart TV platform manager 170 in operation S337, the smart TV platform manager 170 searches for the mobile UI for the corresponding application and loads it to the download buffer in operation S339.

When the mobile interface 151 downloads the mobile UI for the corresponding application loaded into the download buffer into remote control device 10 in operation S341, the remote control device 10 displays the mobile UI for the corresponding application in operation S343. Or, when the HTML-coded UI of the corresponding application is useful, the remote control device 10 does not perform operation S335 to operation S341, and displays the mobile UI for the corresponding application.

Likewise, since operation S301 to operation S343 are performed, the remote control device 10 may launch an application control mode in linkage with the network TV 100.

Figure 15:
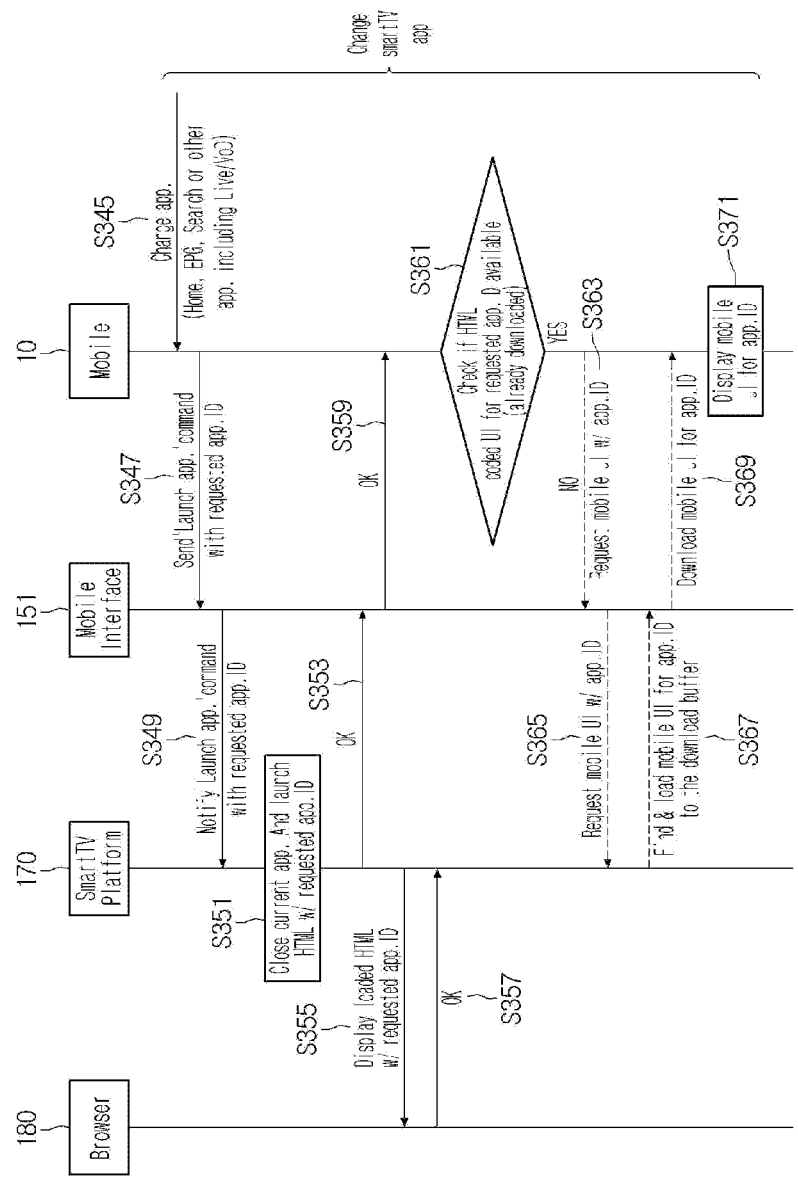
FIG. 15 is a ladder diagram illustrating an application changing method of a network TV according to an embodiment of the present invention.

FIG. 15 is a ladder diagram illustrating an application changing method of a network TV according to an embodiment of the present invention.

Referring to FIG. 15, in an application control mode, the remote control device 10 may receive a user input for changing an application (Change app.) in operation S345. The user input may include a home menu, EPG information, search information or another application information, and the other application information may include information relating to an application that provides real-time broadcast or VOD. At this point, the home menu, the EPG information, and the search information is a kind of another application information.

Then, the remote control device 10 transmits to the mobile interface 151 of the network TV 10 a Launch app. command for a change requested application in operation S347. The Launch app. command may include a change requested app. ID.

Then, when the mobile interface 151 notifies the smart TV platform manager 170 of the Launch app. command including the change requested app. ID in operation S349, the smart TV platform manager 170 stops a currently running application and lunches the HTML execution of the change requested application in operation S351. The currently running application may mean an application running in operation S329.

The smart TV platform manager 170 notifies the remote control device 10 through the mobile interface 151 that the HTML of the change-requested application is loaded in operation S353 and operation S359.

Additionally, when the smart TV platform manager 170 displays to the browser 180 the loaded HTML of the change requested application in operation S355, the browser 180 notifies to the smart TV platform manager 170 that the HTML of the change requested application is loaded (OK) in operation S357.

Then, the remote control device 10 checks whether the HTML-coded UI of the change requested application is useful in operation S333. Then, in order to check whether the HTML-coded UI of the change requested application is useful, the remote control device 10 may check whether the HTML-coded UI of the change requested application is already downloaded.

When the HTML-coded UI of the change requested application is not useful, the remote control device 10 requests a mobile UI for the change requested application to the mobile interface 151 in operation S363.

When the mobile interface 151 requests the mobile UI for the change requested application to the smart TV platform manager 170 in operation S365, the smart TV platform manager 170 searches for the mobile UI for the change requested application and loads it to the download buffer in operation S357.

When the mobile interface 151 downloads the mobile UI for the change requested application loaded into the download buffer into remote control device 10 in operation S369, the remote control device 10 displays the mobile UI for the change requested application in operation S371. Or, when the HTML-coded UI of the change requested application is already downloaded, the remote control device 10 does not perform operation S363 to operation S369, and displays the mobile UI for the change requested application.

Likewise, since operation S345 to operation S371 are performed, the remote control device 10 may change a running application in linkage with the network TV 100. That is, the remote control device 10 confirms whether a UI of a corresponding application is previously stored after receiving currently running application related information. If it is not stored, the remote control device 10 receives a mobile UI of the corresponding application from the network TV 100 and displays it, so that a control service on the network TV 100 may be provided to a user.

Next, referring to FIG. 16, an operation of displaying a page on a network TV when a real-time broadcast application or a VOD application is running and a remote control device controlling the same will be described.

Figure 16:
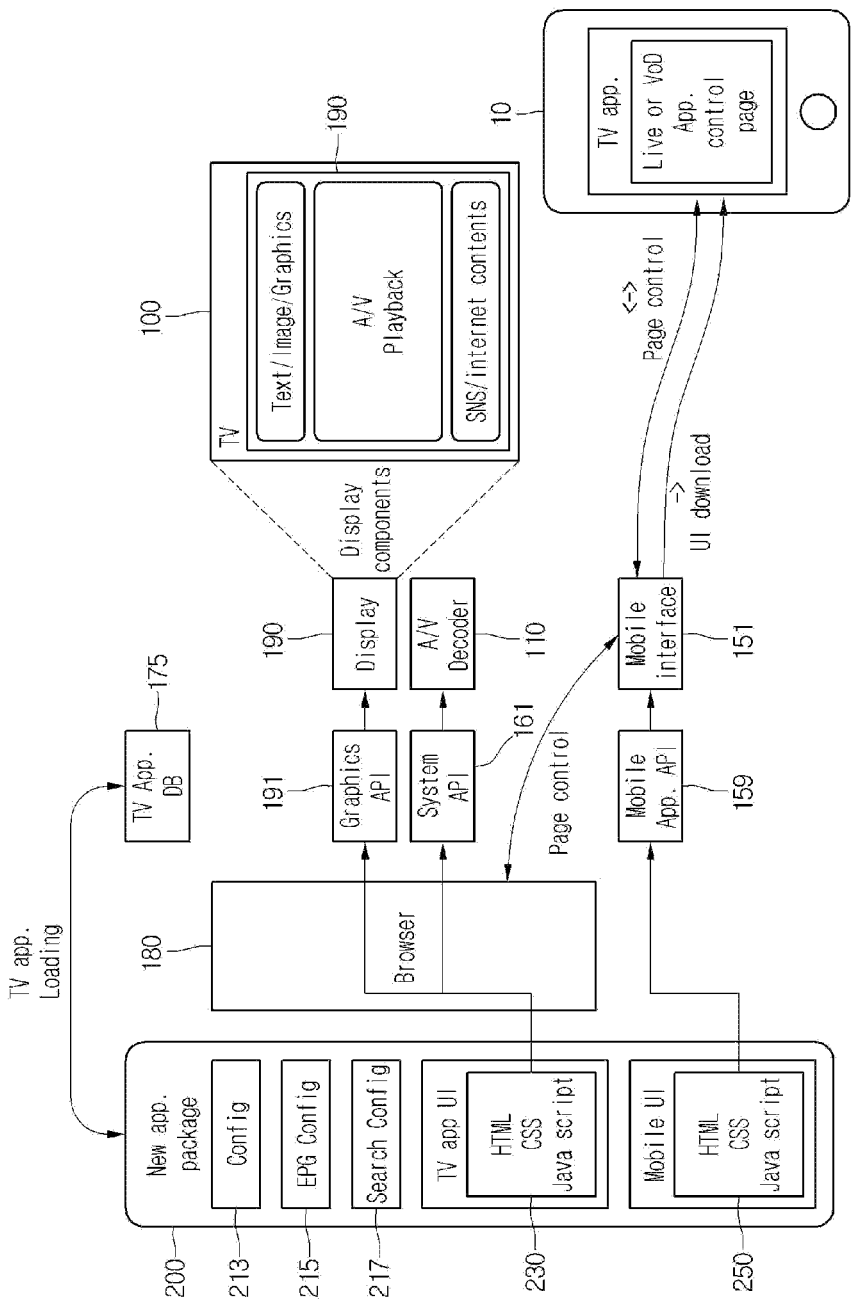
FIG. 16 is a view illustrating a process for executing a real-time broadcast or VOD of a network TV according to an embodiment of the present invention.

FIG. 16 is a view illustrating a process for executing a real-time broadcast or VOD of a network TV according to an embodiment of the present invention.

Referring to FIG. 16, a TV application UI only HTML page is loaded into the network TV 100 through the browser 180 and then is displayed on a screen, and a remote control device UI only HTML page is downloaded into the remote control device 10 through the mobile interface 151 and then is displayed. At this point, a control signal that the remote control device 10 receives according to a user input is delivered to the network TV 100 so as to control an operation of an application. A corresponding operation result may be reflected on an HTML page displayed on the network TV 100 and an HTML page displayed on the remote control device 10.

The browser 180 loads a TV application package 200 selected according to a user input among TV application packages stored in a TV App. DB 175.

The browser 180 extracts a TV application related page 230 from the loaded TV application package 200, and controls the extracted TV application related page 230 to be processed in an A/V decoder 110 and then to be displayed on the display 190. Additionally, the browser 180 may control the extracted TV application related page 230 to be displayed on the display 190 through a Graphics API 191.

As a result, the display 190 may display A/V Playback signals processed in the A/V decoder 110 and a plurality of display components such as Text, Image, Graphics, Social Network Service (SNS) contents, and internet contents, which are processed in the Graphics API 191.

Additionally, the browser 180 may extract a mobile UI related page 250 from the loaded TV application package 200. The browser 180 may download the mobile UI related page 250, which is processed in a Mobile App. API, into the remote control device 10 through the mobile interface 151. The browser 180 may exchange a page control signal with the remote control device 10 through the mobile interface 151.

Next, referring to FIG. 17, a UI displayed on the screens of a network TV and a remote control device when a real-time broadcast application is running will be described.

Figure 17:
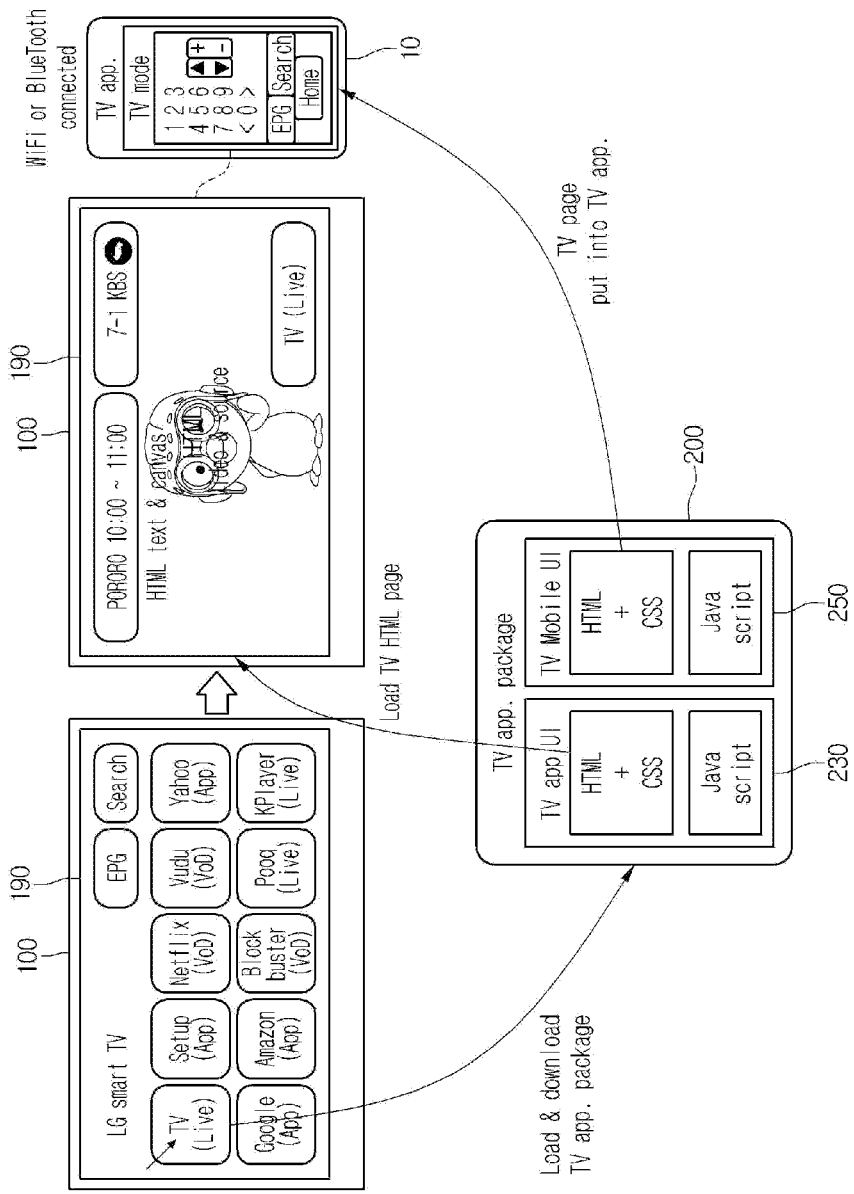
FIG. 17 is a view illustrating an application configuration file executed in a network TV and a remote control device when a real-time broadcast application runs according to an embodiment of the present invention.

FIG. 17 is a view illustrating an application configuration file executed in a network TV and a remote control device when a real-time broadcast application runs according to an embodiment of the present invention.

Referring to FIG. 17, the network TV 100 may execute a broadcast watching mode according to a user input. Once receiving a user input for selecting a real-time broadcast application from a plurality of registered TV application, the network TV 100 loads a TV application package 200 corresponding to the real-time broadcast application from the TV application DB 175.

The browser 180 may control to extract a TV application related page 230 from the loaded TV application package 200 and display it on the display 190. The TV application related page displayed on the display 190 may include an HTML text & canvas file, an HTML image file, and an HTML Video & source file. The HTML text & canvas file may include identification information on a real-time broadcasted program and broadcast time information. The HTML image file may include a logo of a broadcasters providing a real-time broadcast and broadcast channel information. The HTML Video & source file may include video and audio files of a program displayed on the display 190.

Additionally, the browser 180 may extract a mobile UI related page 250 from the loaded TV application package 200. The browser 180 may transmit the mobile UI related page 250 to the remote control device 10 through the mobile interface 151. The remote control device 10 may display the mobile UI related page 250. The mobile UI related page 250 may include mobile UIs such as a button part for controlling a network TV on a broadcast watching mode, an EPG button part, a search button part, and a home button part.

Accordingly, when the remote control device 10 is wirelessly connected to the WiFi Controller 153 and the Bluetooth Controller 155 of the network TV 100, it may control a screen operation of the network TV 100 according to a user input received through the button part. Then, a screen operation result of the network TV 100 is delivered to the remote control device 10, so that a mobile HTML page including the screen operation result reflected may be displayed on the remote control device 10.

Next, referring to FIG. 18, a UI displayed on the screens of a network TV and a remote control device when a VOD application is executed will be described. Hereinafter, the same part described with reference to FIG. 17 will be briefly described or omitted entirely.

Figure 18:
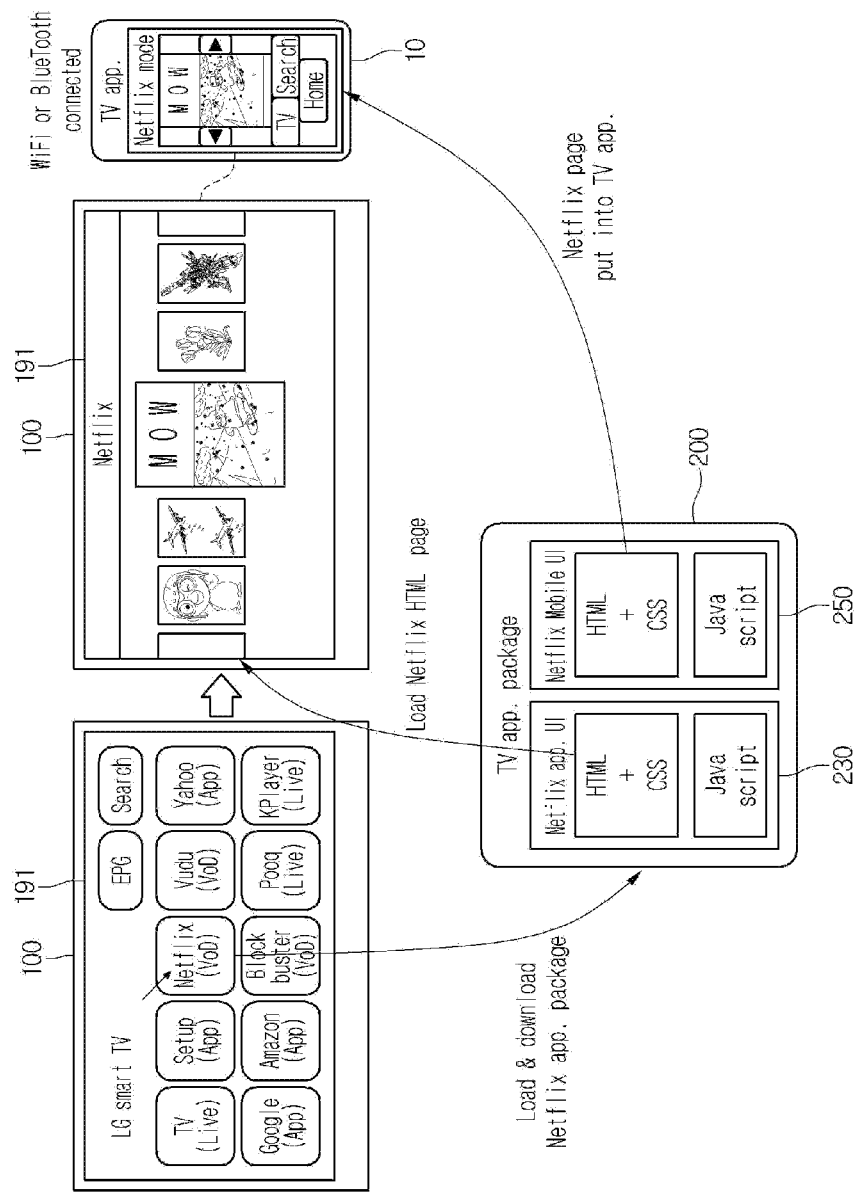
FIG. 18 is a view illustrating an application configuration file executed in a network TV and a remote control device when a VOD application runs according to an embodiment of the present invention.

FIG. 18 is a view illustrating an application configuration file executed in a network TV and a remote control device when a VOD application runs according to an embodiment of the present invention.

Referring to FIG. 18, the network TV 100 may execute a VOD watching mode according to a user input. The VOD watching mode may be a kind of a broadcast watching mode. Once receiving a user input for selecting a VOD application from a plurality of registered TV applications, the network TV 100 loads a TV application package 200 corresponding to the VOD application from the TV application DB 175.

The browser 180 may control to extract a TV application related page 230 from the loaded TV application package 200 and display it on the display 190. The TV application related page 230 displayed on the display 190 may include a VOD list file. The VOD list file may include an icon identifying each VOD.

Additionally, the browser 180 may extract a mobile UI related page 250 from the loaded TV application package 200. When the browser 180 transmits the mobile UI related page 250 to the remote control device 10, the remote control device 10 may display the mobile UI related page 250. The mobile UI related pages 250 may include a VOD list and select buttons for user input.

Accordingly, the remote control device 10 controls a screen operation of the network TV 100 according to a user input received through a button part. Then, a screen operation result of the network TV 100 is delivered to the remote control device 10, so that a mobile HTML page including the screen operation result reflected may be displayed on the remote control device 10.

Next, referring to FIG. 19, an operation of displaying a page on a network TV and a remote control device controlling the same when an EPG application or a search application is executed will be described.

Figure 19:
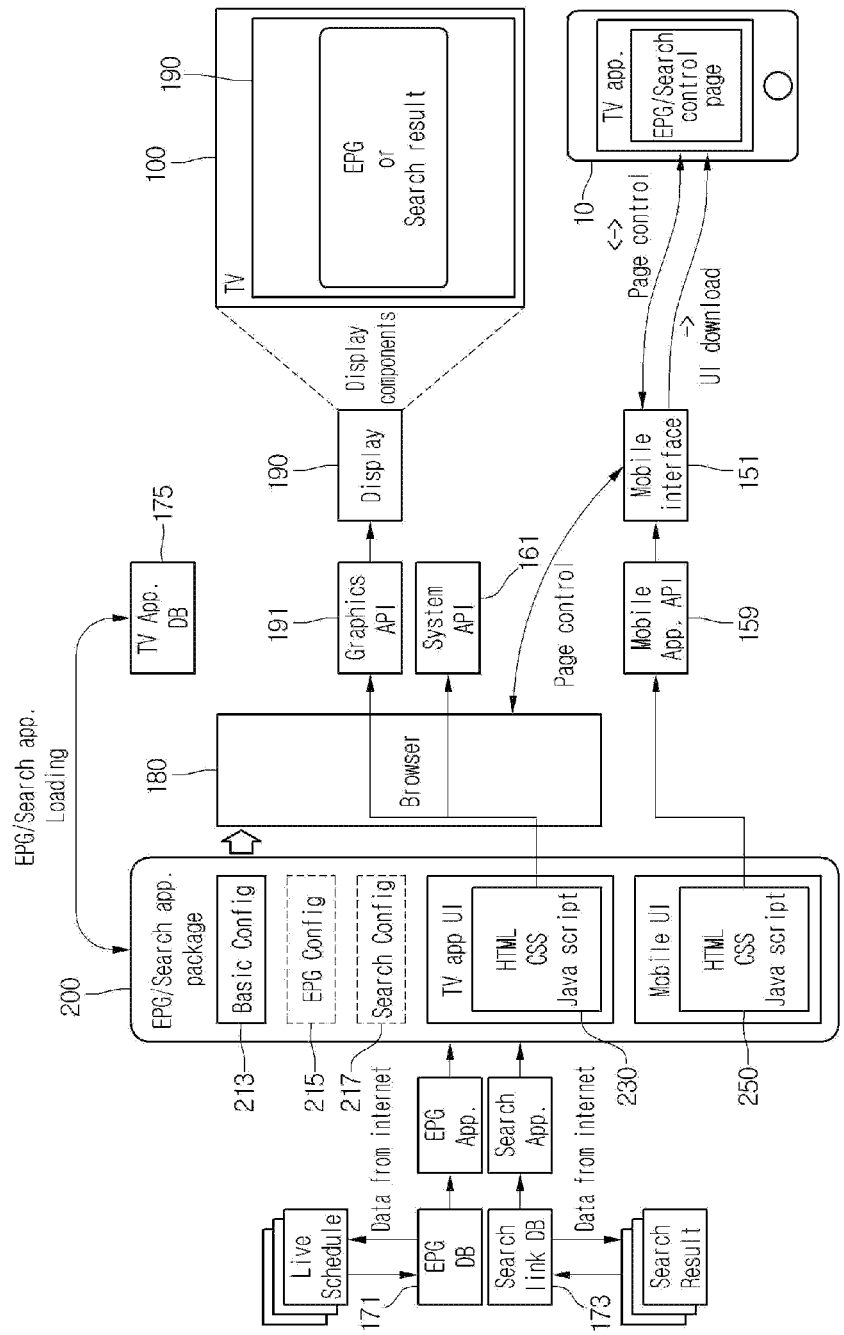
FIG. 19 is a view illustrating a process for executing EPG guide or search application of a network TV according to an embodiment of the present invention.

FIG. 19 is a view illustrating a process for executing a real-time broadcast or VOD of a network TV according to an embodiment of the present invention.

Referring to FIG. 19, a TV application UI only HTML page is loaded into the network TV 100 through the browser 180 and then is displayed on a screen, and a remote control device UI only HTML page is downloaded into the remote control device 10 through the mobile interface 151 and then is displayed. At this point, a control signal that the remote control device 10 receives according to a user input is delivered to the network TV 100 so as to control an operation of an application. A corresponding operation result may be reflected on an HTML page displayed on the network TV 100 and an HTML page displayed on the remote control device 10.

When there is an EPG information request according a user input, the browser 180 may load the EPG application package 200 stored in the TV application DB 175. A user may request EPG information in a real-time broadcast mode.

Once the EPG application is executed, the browser 180 may display the EPG information stored in the EPG DB 171 by using the extracted TV application related page 230 from the EPG application package 200. At this point, the browser 180 may display on the display 190 the TV application related page 230 of an HTML format processed in the graphics API 191.

Additionally, the browser 180 may extract a mobile UI related page 250 from the loaded TV application package 200. The browser 180 may download the mobile UI related page 250, which is processed in a Mobile App. API, into the remote control device 10 through the mobile interface 151. The browser 180 may exchange a page control signal with the remote control device 10 through the mobile interface 151.

Likewise, when there is a search information request according a user input, the browser 180 may load the search application package 200 stored in the TV application DB 175. A user may request VOD content search information in a VOD broadcast mode.

Once the search application is executed, the browser 180 may search for content information in real-time through search path information stored in the search DB 173. At this point, the content information is search result information obtained by searching for each TV application registered in the network TV 100 and receiving it. The browser 180 may display the content information by using the extracted TV application related page 230 from the search application package 200.

Additionally, the browser 180 may extract a mobile UI related page 250 from the loaded TV application package 200. The browser 180 may download the mobile UI related page 250, which is processed in a Mobile App. API, into the remote control device 10 through the mobile interface 151.

The browser 180 may exchange a page control signal with the remote control device 10 through the mobile interface 151.

Through such a process, an EPG result or a search result may be displayed on both the network TV 100 and the remote control device 100.

Next, referring to FIG. 20, a UI displayed on the screens of a network TV and a remote control device when an EPG application is executed will be described.

Figure 20:
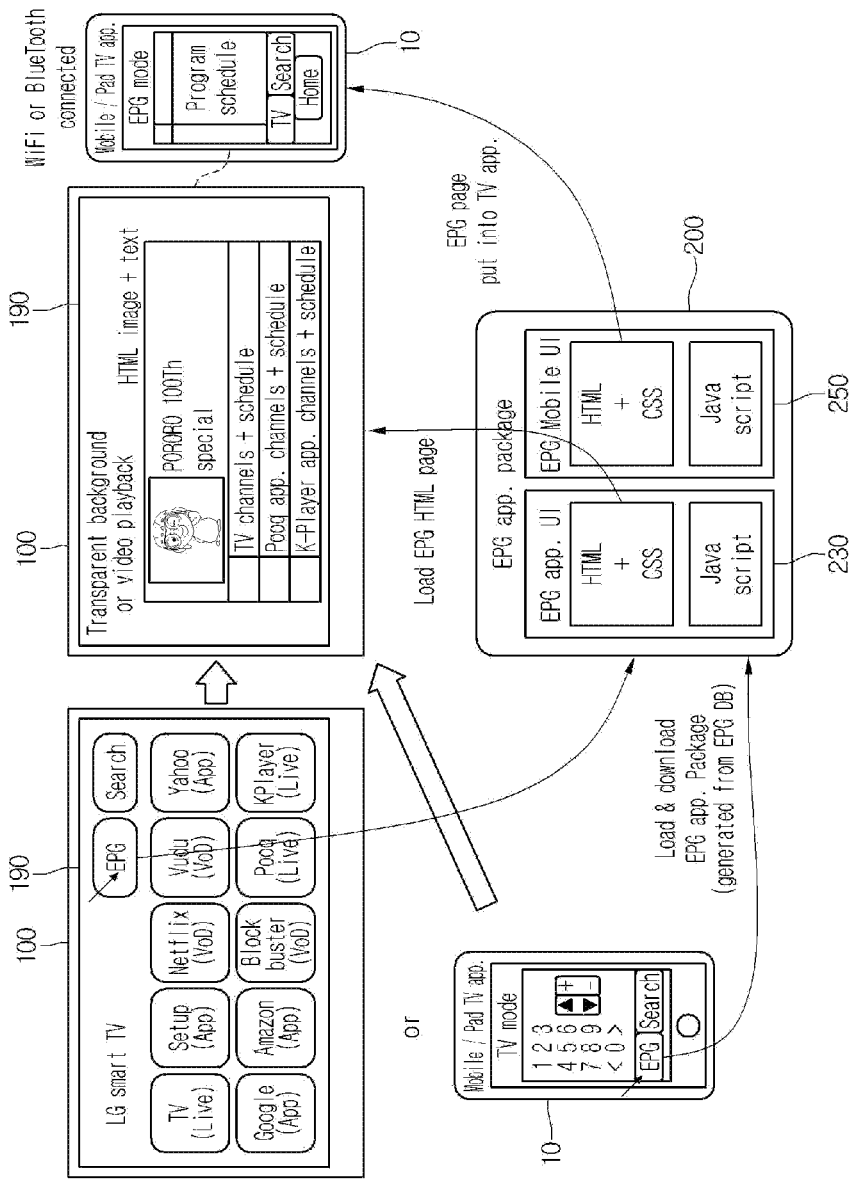
FIG. 20 is a view illustrating an application configuration file executed in a network TV and a remote control device when an EPG application runs according to an embodiment of the present invention.

FIG. 20 is a view illustrating an application configuration file executed in a network TV and a remote control device when an EPG application runs according to an embodiment of the present invention.

Referring to FIG. 20, the network TV 100 may execute an EPG mode according to a user input. Once receiving a user input for selecting an EPG button, the network TV 100 loads an EPG application package 200 from the TV application DB 175.

The browser 180 may control to extract a TV application related page 230 from the loaded EPG application package 200 and display it on the display 190. The TV application related page 230 displayed on the display 190 may include an HTML image file and an HTML text file. Additionally, a TV application related page may display the background of corresponding EPG information transparently or a contents playback screen, but is not limited thereto. The HTML image file and the HTML text file may include information on currently played contents, real-time broadcast channel and schedule information, each application channel and schedule information but are not limited thereto. At this point, the schedule information may be loaded in XML from the EPG DB 171 and then, may be displayed on the display 190.

Additionally, the browser 180 may extract a mobile UI related page 250 from the loaded TV application package 200. The browser 180 may transmit the mobile UI related page 250 and the EPG information to the remote control device 10 through the mobile interface 151. The remote control device 10 may display the mobile UI related page 250. The mobile UI related pages 250 may include a mobile UI such as program schedule on an EPG mode.

Accordingly, when the remote control device 10 is wirelessly connected to the WiFi Controller 153 and the Bluetooth Controller 155 of the network TV 100, it may control an operation of the network TV 100 according to a user input received through the button part. Then, an operation result of the network TV 100 is delivered to the remote control device 10, so that a mobile HTML page including the operation result reflected may be displayed on the remote control device 10.

Next, referring to FIG. 21, a UI displayed on the screens of a network TV and a remote control device when a content search application is executed will be described.

Figure 21:
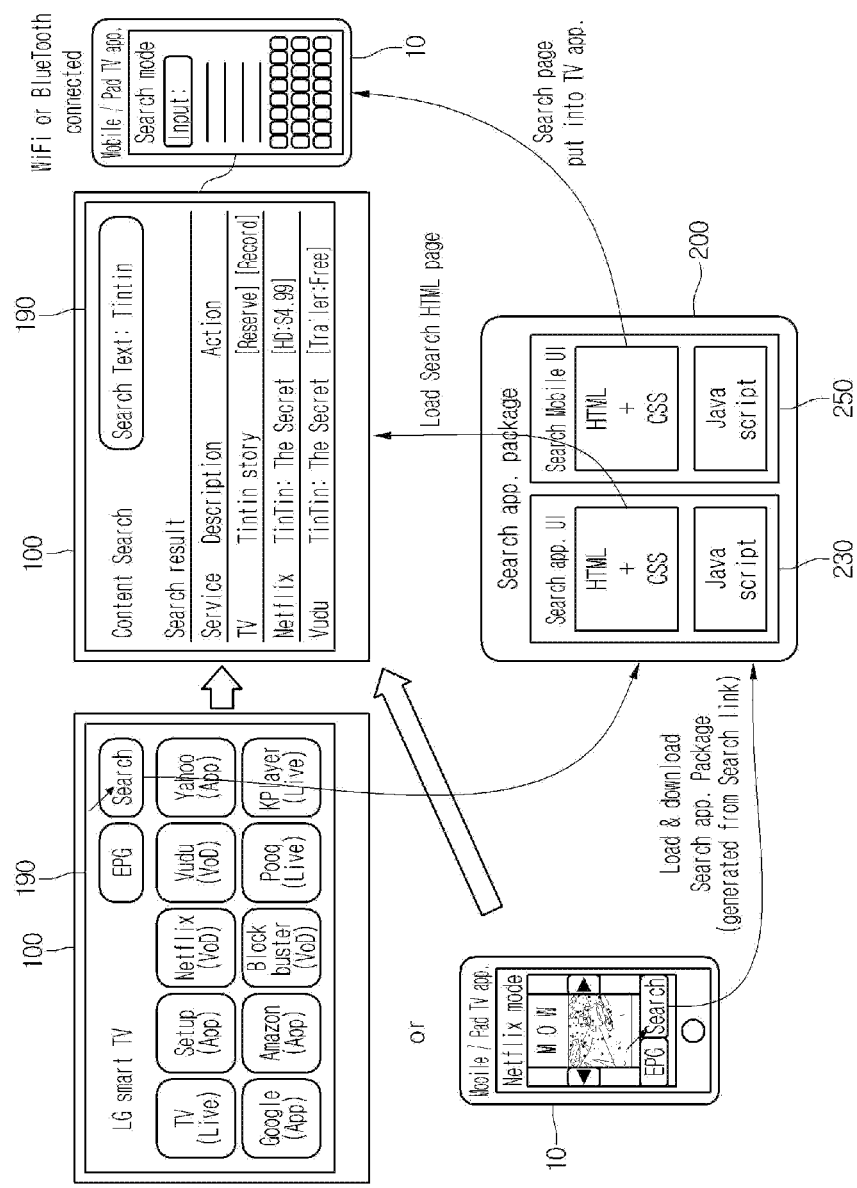
FIG. 21 is a view illustrating an application configuration file executed in a network TV and a remote control device when a search application runs according to an embodiment of the present invention.

FIG. 21 is a view illustrating an application configuration file executed in a network TV and a remote control device when a search application runs according to an embodiment of the present invention.

Referring to FIG. 21, the network TV 100 may execute a contents search mode according to a user input. Once receiving a user input for selecting a search button, the network TV 100 loads a search application package 200 from the TV application DB 175.

The browser 180 may control to display on the display 190 a TV application related page 230 in the loaded EPG application package 200. The TV application related page 230 displayed on the display 190 may include search text information and search result information. The search result information may include identification information on an application providing service, detailed information on contents that each application provides, and information for corresponding contents execution.

Additionally, the browser 180 may extract a mobile UI related page 250 from the loaded search application package 200. The browser 180 may transmit the mobile UI related page 250 and the search information to the remote control device 10 through the mobile interface 151. The remote control device 10 may display the mobile UI related page 250. The mobile UI related pages 250 may include a mobile UI such as search result information on a contents search mode.

Accordingly, when the remote control device 10 is wirelessly connected to the WiFi Controller 153 and the Bluetooth Controller 155 of the network TV 100, it may control a search operation of the network TV 100 according to a user input received through the button part, for example, a search word input signal. That is, the network TV 100 may search for corresponding contents information in a plurality of applications by using search link information stored in the search DB 173. Then, a screen operation result of the network TV 100 is delivered to the remote control device 10, so that a mobile HTML page including the search operation result reflected may be displayed on the remote control device 10.

Figure 22:
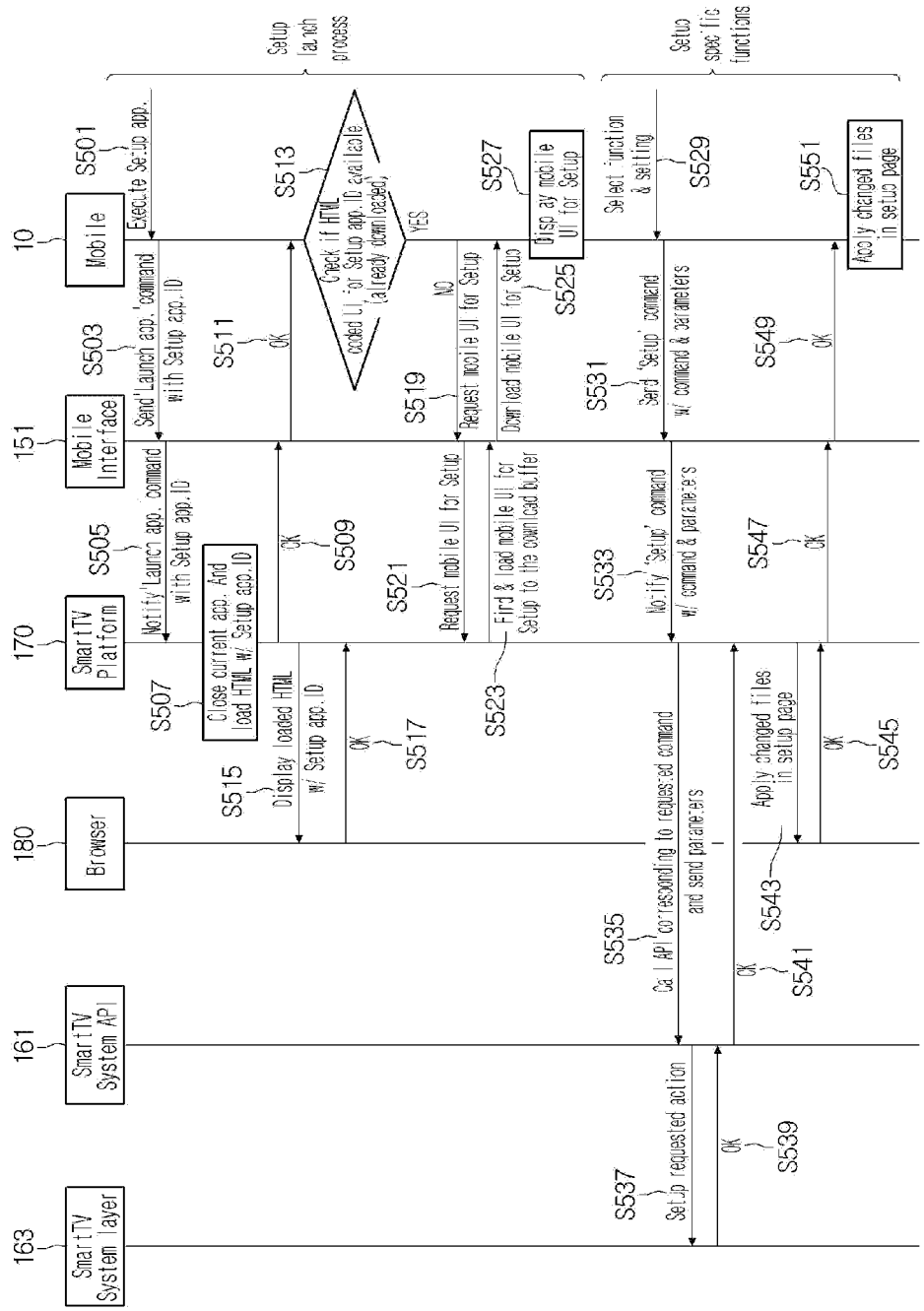
FIG. 22 is a ladder diagram illustrating a network TV setting method according to an embodiment of the present invention.

FIG. 22 is a ladder diagram illustrating a network TV setting method according to an embodiment of the present invention.

Referring to FIG. 22, the remote control device 10 may receive a user input including Execute AppStore app. in operation S501. A setup application may mean an application for network TV setting mode entry.

Then, the remote control device 10 transmits to the mobile interface of the network TV 10 a Launch app. command including a Setup app. ID in operation S503.

Then, when the mobile interface 151 notifies the smart TV platform manager 170 that the Launch app. command including the Setup app. ID is transmitted in operation S505, the smart TV platform manager 170 terminates the currently-executing application, and loads the HTML w/ Setup app. ID in operation S507.

Additionally, when the smart TV platform manager 170 displays the loaded HTML w/ Setup app. ID to the browser 180 in operation S515, the browser 180 transmits to the smart TV platform manager 170 the information (OK) that notifies that the HTML file corresponding to the Setup app. ID is recognized in operation S517.

Then, the smart TV platform manager 170 transmits the HTML file load status (OK) of a corresponding setup application to the remote control device 10 through the mobile interface 151 in operation S509 and operation S511. Then, the remote control device 10 checks whether the HTML-coded UI of a corresponding setup application is useful in operation S513.

When the HTML-coded UI of the corresponding setup application is not useful, the remote control device 10 requests a mobile user interface for the corresponding setup application to the mobile interface 151 in operation S519.

When the mobile interface 151 requests the mobile user interface for the corresponding setup application to the smart TV platform manager 170 in operation S521, the smart TV platform manager 170 searches for the mobile user interface for the corresponding setup application and loads it to the download buffer in operation S523.

When the mobile interface 151 downloads the mobile user interface for the corresponding setup application loaded into the download buffer into remote control device 10 in operation S525, the remote control device 10 displays the mobile user interface for the corresponding setup application in operation S527. Or, when the HTML-coded UI of the corresponding setup application is useful, the remote control device 10 does not perform operation S519 to operation S525, and displays the mobile user interface for the corresponding setup application.

Likewise, since operation S501 to operation S525 are performed, the remote control device 10 may enter a network TV setting mode in linkage with the network TV 100.

In a network TV setup mode, when receiving a user input for selecting and setting a specific function (Select function & setting) in operation S529, the remote control device transmits a Setup Command w/ command & parameters to the mobile interface 151 in operation S531.

Then, when the mobile interface 151 notifies the Setup Command w/ command & parameters to the smart TV platform manager 170 in operation S533, the smart TV platform manager 170 transmits the parameter information to a smart TV system API 161 while calling an API according to the requested command in operation S535.

When the API called smart TV system API 161 transmits the requested action setup signal to the system controller 160 in operation S537, the system controller 160 receives the response (OK) according to the corresponding action setup signal in operation S539. That is, the system controller 160 may perform the received function setup action by using an API. A smart TV system layer may mean the system controller 160.

When receiving a response signal (OK) from the smart TV system API 161 in operation S541, the smart TV platform manager 170 applies changed files on a page set in the browser 180 in operation S543. When the browser 180 transmits the response (OK) for a changed file applying request to the remote control device 10 through the smart TV platform manager 170 and the mobile controller 157 in operations S545, S547, and S549, the remote control device 10 applies the changed file to the set page and displays it in operation S551.

Likewise, since operation S529 to operation S551 are performed, the remote control device 10 may set a specific function of the network TV 100 in linkage with the network TV 100.

Figure 23:
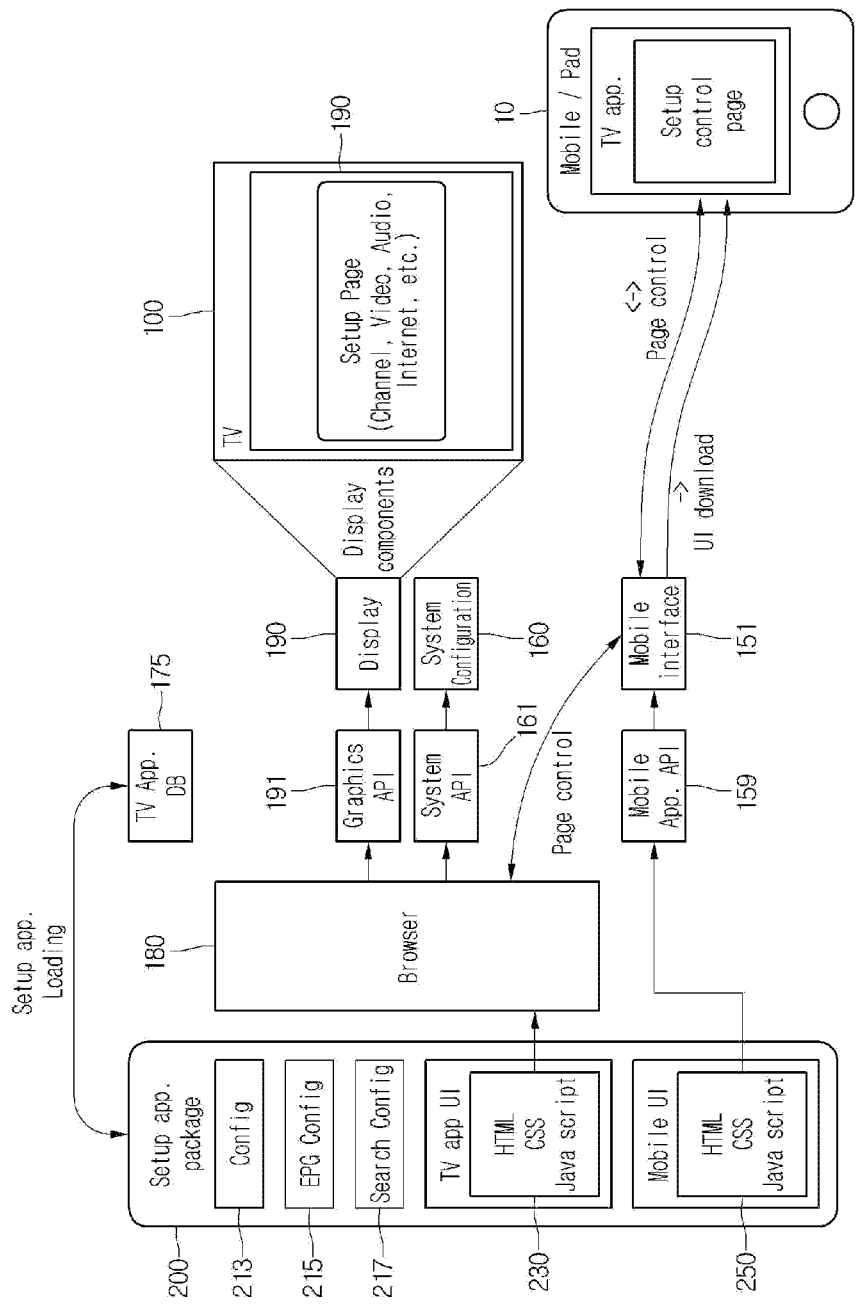
FIG. 23 is a view illustrating an application configuration file executed in a network TV and a remote control device when a setup application runs according to an embodiment of the present invention.

FIG. 23 is a view illustrating an application configuration file executed in a network TV and a remote control device when a configuration application runs according to an embodiment of the present invention.

Referring to FIG. 23, the browser 180 loads a setup application package 200 stored in a TV App. DB 175.

The browser 180 extracts a TV application related page 230 from the loaded setup application package 200, and controls the extracted TV application related page 230 to be displayed on a display 190 through a Graphics API 191. Additionally, the browser 180 may call an API from the system API 161 and then may request a user setup according to a user input to the system controller 160.

As a result, the display 190 displays on the display 190 a setup page including a plurality of display components such as a channel, video, audio, and internet processed in the graphics API 191.

Additionally, the browser 180 may extract a mobile UI related page 250 from the loaded setup application package 200. The browser 180 may download the mobile UI related page 250, which is processed in a Mobile App. API, into the remote control device 10 through the mobile interface 151.

The browser 180 may exchange a setup signal with the remote control device 10 through the mobile interface 151.

FIG. 24 is a table illustrating a network TV setup API according to an embodiment of the present invention.

A setup API described with reference to FIG. 24 may be an API for JavaScript. The setup API may have categories such as channel, video, audio, EPG, search, mobile app., TV app., and general.

A channel setup API may include an API for ScanChannel, an API for AddChannel, an API for HideChannel, an API for DeleteChannel, and an API forGetChannelList, in order to provide search, add, delete functions of a channel, and may manage a channel list.

A video setup API may include an API for SetVideoMode, an API for SetBrightness, an API for SetContrast), an API for SetSharpness, an API for SetColor), an API for GetVideoParameter, and an API for GotoAudioonlymode, in order to provide a function for controlling parameters such as the video mode, brightness, contrast, sharpness, and color of a video.

An audio setup API may include an API for SetAudioMode, an API for SetEqualizer, an API for SetTreble, an API for SetBase), and an API for GetAudioParameter, in order to provide a function of controlling an audio parameter such as sound mode and equalizer.

An EPG setup API may include an API for SetEPGorder, an API for AddEPG, an API for HideEPG, and an API for GetEPGappList, in order to manage a list of applications supporting real-time broadcast and EPG.

An search setup API may include an API for SetSearchOrde, an API for AddSearch, an API for HideSearch, and an API for GetSearchappList), in order to support a function for searching VODs, real-time broadcasts or contents.

A mobile application setup API may include an API for API for FindMobileApp (WiFi/Bluetooth) and an API for GetMobileDeviceList in order to provide a function for controlling mobile device connection such as WiFi or Bluetooth connection or disconnection.

A TV application setup API may include an API for AddTVapp, an API for DeleteTVapp, an API for GetTVappList, and an API for UpdateTVapp, in order to provide a management function for setting, adding, and deleting the order of a TV application list.

A general setup API may include an API for SetWiFiConnection, an API for SetBTConnection), an API for GetConnectionInfo(WiFi/Bluetooth), and an API for GotoStandbymode in order to provide a communication channel setup control function such as WiFi or Bluetooth setup.

According to an embodiment of the present invention, a user interface for unified search is provided in order to allow a user to easily search contents provided from a contents provider while watching a broadcast signal transmitted from a broadcasting station.

The methods according to the above embodiments of the present invention may be realized with a program executed by a general processor such as a computer, and especially, may be realized with flash application or 3D flash application. The realized program may be stored in a computer readable recording medium in a network TV. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices, and further includes carrier waves (such as data transmission through the Internet).

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Besides the above embodiments, there may be contents providers providing numerous kinds of contents in a network TV according to the present invention, and a contents related image displayed each time an icon of each contents provider is selected may vary. These embodiments are included within the scope of the present invention.

What is claimed is:

1. A method of operating a network TV, the method comprising:
   loading an application package selected by a user input;
   extract a first TV-only page from the application package;
   displaying the first TV-only page on a display unit;
   controlling an operation of the application according to a control signal from a mobile terminal;
   executing an action, which is identified by an action code, in the TV-only page;
   displaying a second TV-only page according to a result of action execution identified by the action code, wherein the second TV-only page is identified by a page ID and an object ID among a plurality of pages for the application; and
   transmitting operating information including the page ID, the object ID and the action code to the mobile terminal,
   wherein the operating information is used for displaying a mobile-only page corresponding to the second TV-only page according to the result of action execution in a network TV for guaranteeing an accurate linkage between the second TV-only page and the displayed mobile-only page identified by the page ID and the object ID,
   wherein the each of the TV-only page and the mobile-only page is a Hyper Text Markup Language (HTML) and includes a plurality of objects,
   wherein the controlling the operation of the application comprises;
   transmitting an application ID of a currently running application to the mobile terminal,
   extracting a user interface page for the mobile terminal from the application package,
   receiving a response from the mobile terminal, wherein the response includes a request of a user interface (UI) for the mobile terminal, when a coded UI of the currently running application is not useful, and
   providing the UI for the application which is identified by the transmitted application ID, to the mobile terminal based on the response,
   registering EPG link information when the application provides a real-time broadcast, and
   registering contents search link information when the application provides non-real time contents,
   wherein the EPG link information includes first path information for accessing to a first server which provides an EPG data about the real-time broadcast, and the contents search link information includes second path information for accessing to a second server which provides a searching result about the non-real time contents,
   wherein the first TV-only page includes an HTML text & canvas file, an HTML image file, and an HTML video & source file,
   wherein the UI page for the mobile terminal includes a button part, an EPG button part, a search button part, and a home button part,
   wherein the HTML text & canvas file include identification information on a real-time broadcasted program and broadcast time information, the HTML image file includes a logo of a broadcaster providing a real-time broadcast and broadcast channel information, and the HTML video & source file includes video and audio files of a program displayed on the display unit, when the selected application package is a real-time broadcast application,
   wherein the first TV-only page further includes Video on Demand (VoD) list file containing an icon for identifying the VoD and the UI page for the mobile terminal further includes a VoD list and select button for user input, when the selected application package is a VoD application,
   wherein the first TV-only page further includes information on currently played content, real-time broadcast channel and schedule information, and the UI page for the mobile terminal further includes a program schedule for the mobile terminal, when the selected application packager is an EPG application,
   wherein the first TV-only page further includes search text information and search result information including identification information on the application package which provides a service, detailed information on a content which is provided by the application package and information for content execution, and the UI for the mobile terminal further includes a searching result information for the mobile terminal, when the selected application package is a searching application,
   wherein the first TV-only page further includes a first application programming interface (API) for a channel, a second API for a video, a third API for an audio, a fourth API for an EPG, a fifth API for search, a sixth API for a mobile application, a seventh API for a TV application and a eighth API for a general, when the selected application package is a setting application,
   wherein the first API for managing a channel list includes a channel scanning API, a channel adding API, a channel hiding API, and a channel getting API,
   wherein the second API includes a video mode setting API, a video brightness setting API, a video contrast setting API, a video sharpness setting API, a video color setting API, a video parameter getting API, and an audio only mode API,
   wherein the third API includes an audio mode setting API, an audio equalizer setting API, an audio treble setting API, an audio base setting API, and an audio parameter getting API,
   wherein the fourth API includes a EPG order setting API, a EPG adding API, a EPG hiding API, and a EPG application list getting API,
   wherein the fifth API includes a search order setting API, a search adding API, a search hiding API, and a search application list getting API,
   wherein the sixth API includes a mobile application finding API, and a mobile application getting API,
   wherein the seventh API includes a TV application adding API, a TV application deleting API, a TV application getting API and a TV application updating API, and wherein the eighth API includes a WiFi connection setting API, a Bluetooth connection setting API, and connection information getting API, and standby mode API.

2. The method according to claim 1, wherein the mobile-only page comprises a second object matching a first object in the TV-only page.

3. The method according to claim 2, wherein the controlling of the application operation further comprises controlling the application to operate in a same way as if the first object were selected, when a user input selecting the second object is transmitted.

4. The method according to claim 1, wherein, the controlling of the application operation comprises:
terminating the application operation;
displaying a TV-only page of a changed application;
transmitting to the mobile terminal a mobile-only page that is mutually linked with the TV-only page of the changed application; and
controlling an operation of the changed application according to a user input transmitted from the mobile terminal.

5. A network TV comprising:
a display displaying a first TV-only page extracted from an application package, wherein the first TV-only page includes real-time program identifier, broadcasting time information, a logo of a broadcaster, broadcast channel information;
a mobile interface receiving a control signal, which includes an application identifier (ID) identifying an application, an action code, a page ID, and an object ID from a mobile terminal, transmitting the application ID of a currently running application to the mobile terminal, receiving a response from the mobile terminal, wherein the response includes a request of a user interface (UI) for the mobile terminal, when a coded UI of the currently running application is not useful, and providing the UI for the application which is identified by the transmitted application ID, to the mobile terminal based on the response; and
a browser controlling a TV-only page of the application selected by a user input to be displayed on the display, controlling an operation of the application according to the control signal from the mobile terminal, executing an action, which is identified by an action code, in the TV-only page, and transmitting operating information including the page ID, the object ID and the action code to the mobile terminal;
an EPG storage unit; and
a contents search storage unit,
wherein the display displays a second TV-only page according to a result of action execution identified by the action code,
wherein the second TV-only page is identified by the page ID and the object ID among plurality of pages for the application,
wherein the operating information is used for displaying a mobile-only page corresponding to the second TV-only page according to the result of action execution in the network TV for guaranteeing an accurate linkage between the second TV-only page and the displayed mobile-only page identified by the page ID and the object ID,
wherein the each of the TV-only page and the mobile-only page is a Hyper Text Markup Language (HTML), and includes a plurality of objects,
wherein, when the transmitted user input comprises an application register command, the browser registers EPG link information in the EPG storage unit when the application provides a real-time broadcast, and registers contents search link information in the contents search storage unit when the application provides non-real-time contents,
wherein the EPG link information includes a first path for accessing to a first server which provides an EPG data about the real-time broadcast, and
the contents search link information includes second path information for accessing to a second server which provides a searching result about the non-real time contents,
wherein the UI for the mobile terminal is extracted from the application package by the network TV,
wherein the first TV-only page includes an HTML text & canvas file, an HTML image file, and an HTML video & source file,
wherein the UI page for the mobile terminal includes a button part, an EPG button part, a search button part, and a home button part,
wherein the HTML text & canvas file includes identification information on a real-time broadcasted program and broadcast time information, the HTML image file includes a logo of a broadcaster providing a real-time broadcast and broadcast channel information, and the HTML video & source file include video and audio files of a program displayed on the display unit, when the selected application package is a real-time broadcast application wherein the first TV-only page further includes Video on Demand (VoD) list file containing an icon for identifying the VoD and the UI page for the mobile terminal further includes a VoD list and select button for user input, when the selected application package is a VoD application,
wherein the first TV-only page further includes information on currently played content, real-time broadcast channel and schedule information, and the UI page for the mobile terminal further includes a program schedule for the mobile terminal, when the selected application packager is an EPG application,
wherein the first TV-only page further includes search text information and search result information including identification information on the application package which provides a service, detailed information on a content which is provided by the application package and information for content execution, and the UI for the mobile terminal further includes a searching result information for the mobile terminal, when the selected application package is a searching application,
wherein the first TV-only page further includes a first application programming interface (API) for a channel, a second API for a video, a third API for an audio, a fourth API for an EPG, a fifth API for search, a sixth API for a mobile application, a seventh API for a TV application and a eighth API for a general, when the selected application package is a setting application,
wherein the first API for managing a channel list includes a channel scanning API, a channel adding API, a channel hiding API, and a channel getting API,
wherein the second API includes a video mode setting API, a video brightness setting API, a video contrast setting API, a video sharpness setting API, a video color setting API, a video parameter getting API, and an audio only mode API, wherein the third API includes an audio mode setting API, an audio equalizer setting API, an audio treble setting API, an audio base setting API, and an audio parameter getting API, wherein the fourth API includes a EPG order setting API, a EPG adding API, a EPG hiding API, and a EPG application list getting API, wherein the fifth API includes a search order setting API, a search adding API, a search hiding API, and a search application list getting API, wherein the sixth API includes a mobile application finding API, and a mobile application getting API, wherein the seventh API includes a TV application adding API, a TV application deleting API, a TV application getting API and a TV application updating API, and wherein the eighth API includes a WiFi connection setting API, a Bluetooth connection setting API, and connection information getting API, and standby mode API.

6. The network TV according to claim 5, wherein the mobile-only page comprises a second object matching a first object included in the TV-only page.

7. The network TV according to claim 6, wherein the browser controls the application to operate in a same way as if the first object were selected, when a user input selecting the second object is transmitted.

* * * * *